(12) United States Patent
Wong

(10) Patent No.: US 9,015,139 B2
(45) Date of Patent: Apr. 21, 2015

(54) SYSTEMS AND METHODS FOR PERFORMING A SEARCH BASED ON A MEDIA CONTENT SNAPSHOT IMAGE

(75) Inventor: Ka Chun Wong, Tai Po (HK)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 12/780,489

(22) Filed: May 14, 2010

(65) Prior Publication Data

US 2011/0282906 A1 Nov. 17, 2011

(51) Int. Cl.
*G06F 17/30* (2006.01)

(52) U.S. Cl.
CPC .... *G06F 17/30247* (2013.01); *G06F 17/30265* (2013.01); *G06F 17/3079* (2013.01); *G06F 17/30793* (2013.01); *G06F 17/30817* (2013.01); *G06F 17/3082* (2013.01); *G06F 17/30831* (2013.01)

(58) Field of Classification Search
CPC .................................................... G06F 17/30
USPC .................................................. 707/600–899
See application file for complete search history.

(56) References Cited

U.S. PATENT DOCUMENTS

| | | | |
|---|---|---|---|
| 6,301,370 | B1 | 10/2001 | Steffens et al. |
| 7,016,916 | B1 | 3/2006 | Lee et al. |
| 7,421,125 | B1 | 9/2008 | Rees |
| 7,478,091 | B2 | 1/2009 | Mojsilovic et al. |
| 7,565,139 | B2 | 7/2009 | Neven, Sr. et al. |
| RE42,413 | E * | 5/2011 | Snyder .......................... 707/802 |
| 2002/0168117 | A1 | 11/2002 | Lee et al. |
| 2005/0185060 | A1 | 8/2005 | Neven, Sr. |
| 2006/0012677 | A1 | 1/2006 | Neven, Sr. et al. |
| 2006/0240862 | A1 | 10/2006 | Neven et al. |
| 2006/0251338 | A1 | 11/2006 | Gokturk et al. |
| 2007/0286463 | A1 | 12/2007 | Ritzau et al. |
| 2007/0288453 | A1 | 12/2007 | Podilchuk |
| 2008/0022133 | A1 * | 1/2008 | Sobel et al. ................... 713/193 |
| 2008/0162437 | A1 | 7/2008 | Choi et al. |
| 2008/0320546 | A1 * | 12/2008 | Moon et al. ................... 725/136 |
| 2009/0112862 | A1 | 4/2009 | Mo |
| 2009/0240735 | A1 | 9/2009 | Grandhi et al. |
| 2009/0281655 | A1 | 11/2009 | McKernan et al. |
| 2010/0021021 | A1 | 1/2010 | Shah et al. |
| 2010/0070529 | A1 | 3/2010 | Gokturk et al. |
| 2010/0333123 | A1 * | 12/2010 | Mehta .............................. 725/13 |
| 2011/0029561 | A1 * | 2/2011 | Slaney et al. ................. 707/772 |

OTHER PUBLICATIONS

Santini et al., "Integrated Browing and Quering for Image Databases", IEEE Multimedia, IEEE Service Center, New York, NY, vol. 7, No. 3, dated Jul. 1, 2000, pp. 26-39.

(Continued)

*Primary Examiner* — Isaac M Woo
(74) *Attorney, Agent, or Firm* — Ropes & Gray LLP

(57) ABSTRACT

Systems and methods are provided for performing a search based on a snapshot image captured from media content presented to a user. The snapshot image contains features of the media content that the user wishes to target for the search. A search system recognizes features of the snapshot image and creates a search query based on the snapshot image. The search query is used to identify features of the snapshot image, and search results related to the identified features are presented to the user. Supplemental data or user input received with the snapshot image may be used in analyzing and identifying features of the snapshot image.

16 Claims, 19 Drawing Sheets

(56) References Cited

OTHER PUBLICATIONS

Bolle et al., "Content-Based Digital Video Retrieval", Broadcasting Convention, 1997. IBS 97, International (Conf. Publ. 447) Amsterdam, Nertherlands, Convention held Sep. 12-16, 1997 Lond, UK, IEEE, pp. 160-165.

Zhang et al., "Face Annotation for Family Photo Management", vol. 3, No. 1, dated Jan. 1, 2003.

Flickner et al., "Query by Image and Video Content: The QBIC: System", Computer, IEEE Service Center, Los Alamito, CA, vol. 28, No. 9, Sep. 1, 1995.

International Search Report PCT/US2011/035544 mailed Sep. 22, 2011.

\* cited by examiner

SYSTEMS AND METHODS FOR PERFORMING A SEARCH BASED ON A MEDIA CONTENT SNAPSHOT IMAGE

BACKGROUND OF THE INVENTION

The present invention relates generally to performing a search based on media content, and more particularly, to performing a search based on a snapshot image captured from media content.

Image-based search systems can be utilized to perform a search using an image that contains features relevant to the search. A search system may analyze an image received from a user to recognize and identify features in the image. To identify the features, the search system may use patterns in the search image to locate other images that exhibit similar patterns. When an image with a suitable level of pattern similarity is found, the search system uses known information for the image to identify the similar feature in the search image. The identified feature is then presented to the user.

Image matching systems may often include a large number of images and information that can be used to find matches for search image features. The feature matching algorithm can be slowed by the number of images available as each image is compared individually to the search image. Identifying features contained in search images may include comparing the features with many potential matching images, and the search system may require a large amount of memory and/or time to perform the search. If images with very similar features are available, the search system may have difficulty selecting one image as a match and may return a false match containing features that are very similar but not the same as features in the search image. Accordingly, it would be desirable to provide an image-based search system that is capable of performing an efficient search based on an image captured from media content.

SUMMARY OF THE INVENTION

In view of the foregoing, systems and methods for performing an image-based search using an image captured from media content are provided. The system utilizes context information associated with the media content to narrow the search and increase accuracy and efficiency of the search. The context information may be used to identify a subset of a collection of searchable data used for the search. By performing the search using the data subset, the system is able to compare the captured image to a smaller number of potentially matching images to identify features in the captured image. The smaller number of potential matches may allow the search system to perform the search faster and may decrease the chance of returning an incorrect match.

In some embodiments, supplemental data related to the media content from which a snapshot image is captured may be provided to the search system. The search system may analyze the supplemental data to perform an effective search. The supplemental data may be used to determine which features of the snapshot image to target in the search and identify a data subset to be used for the search. By performing the search using the data subset rather than a full collection of searchable data, the search system can increase the effectiveness and efficiency of the image-based search.

In some embodiments, user input related to a snapshot image search may be provided to the search system. The user input may contain added context information in addition to supplemental data for the snapshot image or may indicate user preferences related to the search to be performed. By analyzing the user input, the search system may obtain narrowing details in addition to the information obtained from supplemental data and increase the effectiveness and efficiency of the image-based search.

In some embodiments, interaction between a user and a search system may dictate aspects of an image-based search or refine an image-based search after search results are obtained. If a captured snapshot image contains multiple searchable features, the search system may initiate interaction with the user to identify the features to be used for the search or clarify preferences related to presentation of search results. A user may also interact with the search system after a search is performed to refine the search. The user may receive search results that are not of interest to the user, and the user may wish to refine criteria used in the search to obtain the desired results. The user may initiate interaction with the search system to adjust the search criteria and perform a new search.

Further features of the invention, its nature, and various advantages will be more apparent from the accompanying drawings and the following detailed description of the preferred embodiments.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

The amount of media available to users in any given media delivery system may be substantial. Users may have access to conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), recorded programs (e.g., on a digital video recorder (DVR) system), and other types of media or video content. The term multimedia is defined herein as media and content that utilizes at least two different content forms, such as text, audio, still images, animation, video, and interactivity content forms. Multimedia content may be recorded and played, displayed, or accessed by information content processing devices, such as computerized and electronic devices, but may also be part of a live performance. It should be understood that the invention embodiments that are described in relation to media or media content are also applicable to other types of content, such as video, audio and/or multimedia.

A user accessing any form of media content may wish to perform a search based on the media content. The user may, for example, want to identify something shown on a display, such as an actor or a handbag in a scene. The user may also want to identify the media content if the user is viewing a short video clip taken, for example, from a movie or television show, or a user may want to identify the source of the media content if, for example, the media content is from an unknown source.

A snapshot image can be captured from the media content and used, along with any available supplemental data and user input, to perform the desired search. The snapshot image may be captured by a media delivery system from a frame of the media content that contains features that the user wishes to use for the search. The frame of the media content may correspond to the frame that is on screen at the time the user initiates the search. The snapshot image may also be a digital image that contains either all or just a portion of a display on which the user is viewing media content and is captured using a camera on an external device. The captured snapshot image can then be sent to a search system to perform the desired search.

Figure 1:
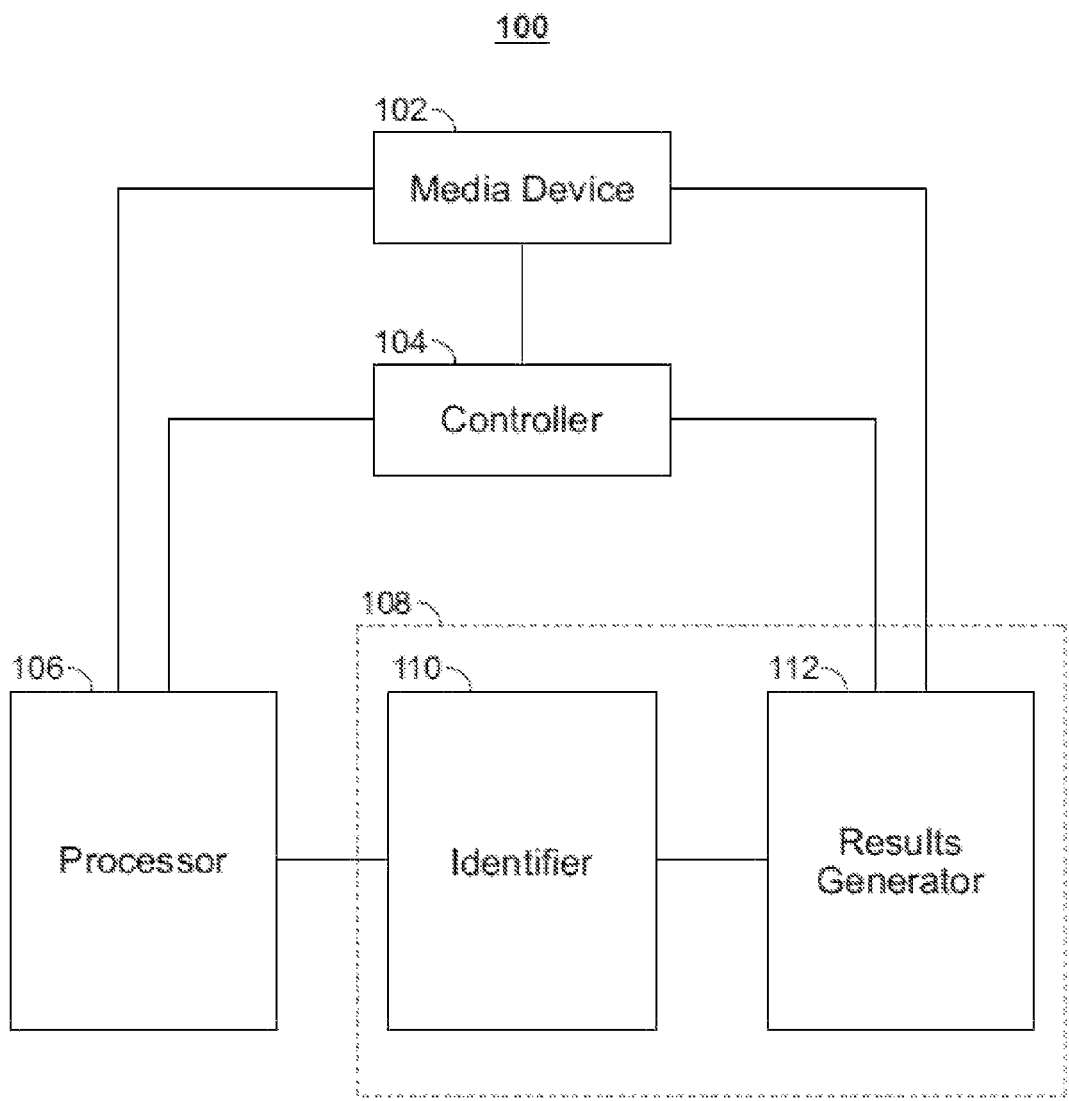
FIG. 1 shows an illustrative search system for searching based on a snapshot image captured from media content in accordance with an embodiment of the present invention.

An illustrative search system 100 for searching based on a snapshot image captured from media content is shown in FIG. 1. Media content is presented to a user on media device 102. Media device 102 may be a television, personal computer (PC), laptop computer, mobile telephone, smartphone, or any other suitable media device capable of presenting media content to a user. Media device 102 may correspond, for example, to media device 200 of FIG. 2. Media device 102 may be any type of device capable of presenting media content to a user, and may correspond to any type of device described below with respect to media devices 302, 304, or 306 of FIG. 3. Media device 102 may receive media content to present to a user over a wired or wireless connection using any suitable communications protocol.

A user can control media device 102 using controller 104. Controller 104 may be integrated with media device 102 or, alternatively, may be a separate device. Controller 104 may include a user input interface, such as a remote control, mouse, trackball, keypad, keyboard, touch screen, touch pad, stylus input, joystick, voice recognition interface, or any other suitable user input interface. Controller 104 may also include an integrated camera for capturing digital images. A display on controller 104 may be used to present media content to a user, display relevant information associated with media content presented on media device 102, assist the user in entering commands or requests, show digital images captured by a camera on controller 104, present search results to a user, or perform any other suitable display function. The user may also use controller 104 to configure settings or control the performance of media device 102.

A user viewing media content on media device 102 may wish to perform a search based on the media content being viewed. For example, a user may want to find the name of a character in a scene, identify the media content being viewed, identify an unknown source of a video, locate retail locations and prices for an item in a commercial or movie, access more episodes of a certain television series, or perform any other suitable search based on the media content.

To initiate the search, the user captures a snapshot image of the on-screen media content and uses the captured snapshot image as a search entry. The user captures a snapshot image that contains the items or features of the media content that the user wishes to use for the search. For example, if the user is trying to find the name of an actor, the snapshot image is captured when the actor's face is on screen. The user may capture the snapshot image using either media device 102 or controller 104. The user may capture the snapshot image using media device 102 by pressing a search initiation button on media device 102, touching a touch-sensitive display screen on media device 102, speaking a command to a voice recognition interface (e.g., a microphone) on media device 102, or by any other suitable capturing approach. The user may capture the snapshot image using controller 104 by pressing a search initiation button on controller 104, speaking a command to a voice recognition interface (e.g., a microphone) on controller 104, capturing a digital image using a camera on controller 104, sending a command from controller 104 to pause media content on media device 102 and capture the frame on which the media content is paused, or by any other suitable capturing approach.

The captured snapshot image is sent from media device 102 or controller 104 to processor 106. Processor 106 is shown in FIG. 1 as a standalone device, but may also be integrated with media device 102, controller 104, search engine 108, or any suitable combination thereof. Processor 106 analyzes the image to determine any features of the image that may be used to perform a search. Processor 106 may recognize, for example, faces, logos, objects, text, any other suitable features, or any combination thereof. The recognized features of the image are used to translate the image into text descriptors that can be packaged with search images in a search query and used to supplement the search performed based on the snapshot image. The text descriptors may identify objects in the snapshot image, indicate visual features of the snapshot image, dictate text that is found in the snapshot image, or describe any other suitable features of the snapshot image.

If multiple objects of different types are recognized in a snapshot image, processor 106 may determine which objects of the snapshot image to target for a search. For example, processor 106 may only target a logo only if it is a channel logo or a logo located on an object that is also included in the search. Processor 106 may also determine that faces are more likely to be search targets than background objects and may only target background objects if no faces are recognized in the snapshot image. The determination of objects to target for the search may be made automatically by the system or may be based on a user configuration of processor 106, a user's preferences determined from past searches, information included in supplemental data for the snapshot image, or any other suitable criteria. In addition, objects included in the search may be determined based on user input provided with the snapshot image or user input provided in response to a prompt from the search system.

Supplemental data may be included with the snapshot image sent to processor 106. The supplemental data may include useful identifying or context information about the media content from which the snapshot image is captured. The information may identify a broadcast channel, broadcast region, cable provider, television network, television series, episode, scene ID, movie title, actor cast, advertiser, website, media source, MPEG metadata, or any other suitable aspect of the media content. Processor 106 can analyze the supplemental data and include useful media content information in the text descriptors for the snapshot image to provide a more effective search query to a search engine. The supplemental data may include information that is not known by the user and can be used by a search engine for an efficient search. For example, a snapshot image of an actor's face captured from a movie may be sent to processor 106 with a list of the cast of the movie that is unknown to the user. Processor 106 can include all actors in the cast list or the scene ID for the scene from which the snapshot image was captured in the search query sent to a search engine. The search engine can thus be targeted to match a face in the snapshot image using images of the actors in the cast list or actors known to be in the scene rather than trying to match the face using images of all known actors. Processor 106 may thus be able to provide context information in the search query without requiring the user's input and may even produce a more effective search query than the user could produce on his or her own.

User input may also be included with the snapshot image sent to processor 106. User input may be received at a user input interface integrated with either media device 102 or controller 104. User input may specify the type of search the user would like to perform. For example, for a captured snapshot image with multiple recognizable features, user input may indicate which of the features the user would like to use for the search. When a snapshot image contains a face, an object, and a logo, the user may send user input that requests a search performed on the face. User input may also include information about the media content that is not included in supplemental data sent with the image, or any other suitable information that can be used by processor 106 to produce a useful search query.

The search query output from processor 106 includes search images and any text descriptors that describe features in the images. The text descriptors may indicate the types of features recognized in the snapshot image, information extracted from the supplemental data received with the snapshot image, information extracted from user input received with the snapshot image, or any other suitable information.

The search query created by processor 106 is sent to search engine 108. Search engine 108 is shown in FIG. 1 as a standalone device, but may also be integrated with media device 102, controller 104, processor 106, or any suitable combination thereof. Search engine 108 includes identifier 110 and results generator 112. Identifier 110 analyzes the text and images in the search query provided by processor 106 and outputs identifications for the desired feature or features in the snapshot image. Identifier 110 analyzes text descriptors and search images in the search query in an attempt to target the search to a subset of data to efficiently identify images and information as potential matches for targeted features of the captured snapshot image. Once potential matching images are identified, accepted matches are determined. Accepted matches may be determined by evaluating the similarity between images and descriptors for potential matches and images and descriptors in the search query. Using the similarity evaluations, accepted matches may be determined by applying a threshold level of similarity, by ranking the potential matches, or by any other suitable approach. Identifier 110 then outputs one or more feature identifications based on the accepted matches for the targeted features of the snapshot image.

The feature identifications from identifier 110 are sent to results generator 112 to be used for gathering and preparing search results to be presented to the user. Results generator 112 uses the identifications to locate information and content related to the targeted features of the snapshot image to present to the user. Results generator 112 may include media content sources, information sources, Internet sources, display template sources, or any other suitable sources for gathering and presenting search results to the user. Results generator 112 uses the feature identifications received from identifier 110 to retrieve any relevant information or content and assembles the search results for presentation to the user. The search results may then be presented to the user on media device 102, on controller 104, by email, through an Internet browser, or by any other suitable approach.

The user may choose to refine the search or perform a secondary search after receiving the search results from search engine 108. The search results display may include an option for the user to amend the search query or further specify desired aspects of the search in order to facilitate refining the search. If the features of the snapshot image targeted for the search are not the desired search features, the user may correct the feature targeting and reenter the image to the search system. For example, if the first of two recognized objects is targeted in the search and the user wishes to receive information related to the second object, the user may change the targeting by choosing the second object from a list or touching the second object on a touch-sensitive screen on either media device 102 or controller 104. The search system will then perform a new search for the second object. Alternatively, a search may be run for each object and a quick profile of information related to each object may be displayed in the search results. The user may then select one of the objects, and the search engine may generate a new search results display containing more detailed information for the selected object.

Figure 2:
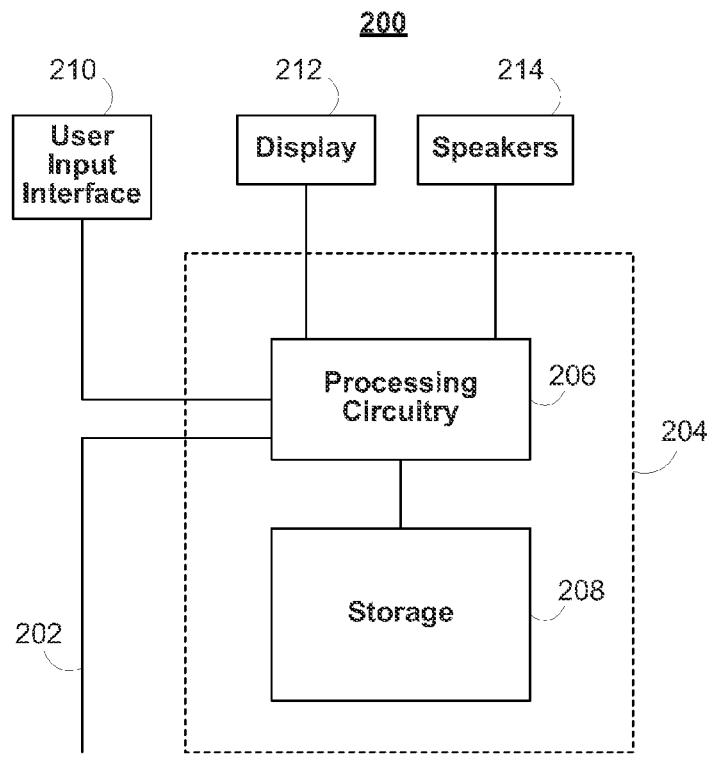
FIG. 2 shows an illustrative media device in accordance with an embodiment of the present invention.

A generalized embodiment of an illustrative media device for use in an image-based searching system (e.g., search system 100 of FIG. 1) is shown in FIG. 2. Media device 200 may correspond, for example, to media device 102 of FIG. 1. Media device 200 may receive media content and data via input/output (hereinafter "I/O") path 202. I/O path 202 may provide media content (e.g., broadcast programming, on-demand programming, Internet content, and other video or audio) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O path 202 may also be used to communicate with a search system to send captured snapshot images to a processor (e.g., processor 106 of FIG. 1) or receive search results from a search engine (e.g., search engine 108 of FIG. 1). I/O functions may be provided by one or more of these communications paths, but are shown as a single path in FIG. 2 to avoid overcomplicating the drawing.

Control circuitry 204 may be based on any suitable processing circuitry 206 such as processing circuitry based on one or more microprocessors, microcontrollers, digital signal processors, programmable logic devices, etc. In some embodiments, control circuitry 204 executes instructions for media content stored in memory (e.g., storage 208). In some embodiments, control circuitry 204 may include communications circuitry suitable for communicating with a media content server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which will be described in more detail in connection with FIG. 3). Communications may involve sending snapshot images, supplemental data, or user input to a search system and receiving search results to display to a user. In addition, communications circuitry may include circuitry that enables peer-to-peer communication of media devices, or communication of media devices in locations remote from each other (described in more detail below).

Memory (e.g. random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 208 that is part of control circuitry 204. Storage 208 may include one or more of the above types of storage devices. For example, media device 200 may include a hard drive for a digital video recorder (DVR), sometimes called a personal video recorder (PVR), and a DVD recorder as a secondary storage device. Storage 208 may be used to store various types of media content described herein. Nonvolatile memory may also be used (e.g., to launch a boot-up routine and other instructions).

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include image capturing circuitry for capturing snapshot images from media content to be used in a search. Control circuitry 204 may also include scaler circuitry for upconverting and downconverting media content into the preferred output format of media device 200. Control circuitry 204 may also include digital-to-analog converter circuitry and analog-to-digital converter circuitry for converting between digital and analog signals. The tuning and encoding circuitry may be used by the media device to receive and display, play, or record media content. The tuning and encoding circuitry may also be used to receive media content data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from media device 200, the tuning and encoding circuitry (including multiple tuners) may be associated with storage 208.

A user may control the control circuitry 204 using user input interface 210. User input interface 210 may be any suitable user interface, such as a remote control, mouse, trackball, keypad, keyboard, touch screen, touch pad, stylus input, joystick, voice recognition interface, or any other suitable user input interface. User input interface 210 may be used by the user to provide input used in an image-based search in order to, for example, indicate features of a snapshot image to target or dictate preferences related to the display of search results. Display 212 may be provided as a stand-alone device or may be integrated with other elements of media device 200. Display 212 may be one or more of a monitor, a television, a liquid crystal display (LCD) for a mobile device, or any other suitable equipment for displaying visual images. In some embodiments, display 212 may be HDTV-capable. Speakers 214 may be provided as integrated with other elements of media device 200 or may be stand-alone units. The audio component of videos and other media content displayed on display 212 may be played through speakers 214. In some embodiments, the audio may be distributed to a receiver (not shown), which processes and outputs the audio via speakers 214.

Figure 3:
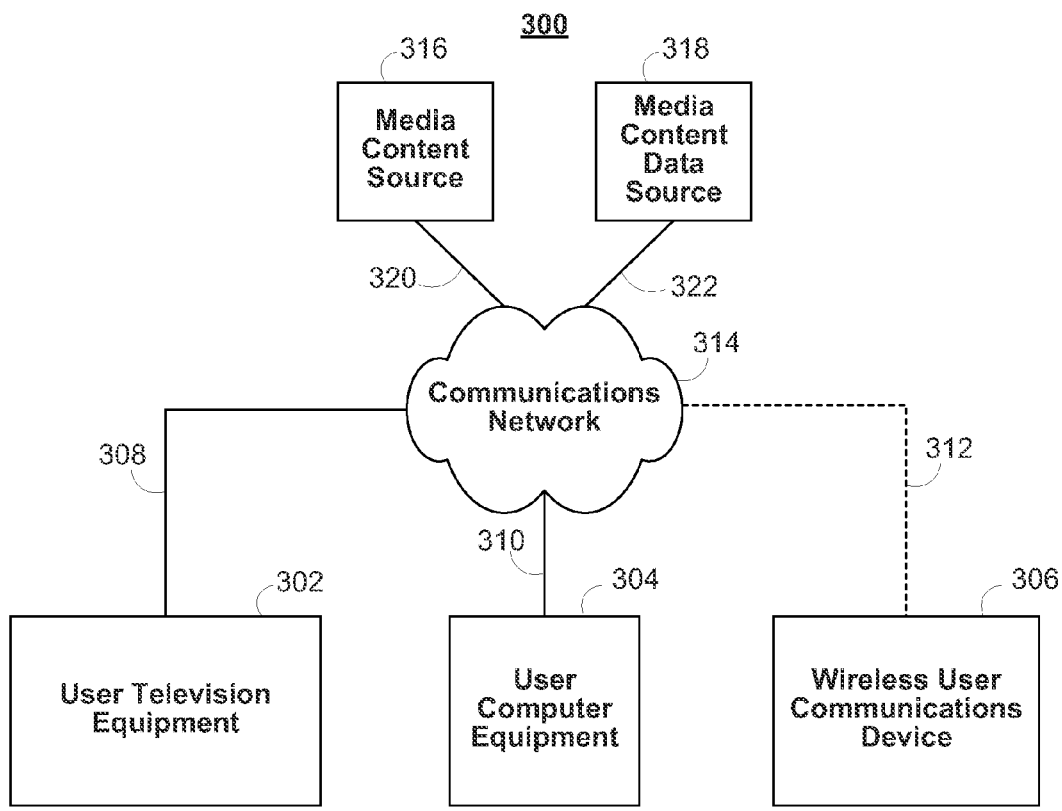
FIG. 3 shows an illustrative media device system in accordance with an embodiment of the present invention.

A media device (e.g., media device 200 of FIG. 2) can be implemented in illustrative system 300 of FIG. 3 as user television equipment 302, user computer equipment 304, wireless user communications device 306, or any other type of media device suitable for accessing media, such as a non-portable gaming machine. For simplicity, these devices may be referred to herein collectively as media devices. A media device, on which media content is presented, may function as a standalone device or may be part of a network of devices. Various network configurations of devices may be implemented and are discussed in more detail below.

User television equipment 302 may include a set-top box, an integrated receiver decoder (IRD) for handling satellite television, a television set, a digital storage device, a DVD recorder, a video-cassette recorder (VCR), a local media server, or other suitable user television equipment. One or more of these devices may be integrated to be a single device, if desired. User computer equipment 304 may include a PC, a laptop, a tablet, a personal computer television (PC/TV), a PC media server, a PC media center, or other suitable user computer equipment. Wireless user communications device 306 may include a personal digital assistant (PDA), a mobile telephone, a smartphone, a portable video player, a portable music player, a portable gaming machine, or other suitable wireless devices.

It should be noted that with the advent of television tuner cards for PCs and the integration of video into other devices, the lines have become blurred when trying to classify a device as one of the above devices. In fact, each of user television equipment 302, user computer equipment 304, and wireless user communications device 306 may utilize at least some of the system features described above in connection with FIG. 2 and, as a result, include flexibility with respect to the type of media content available on the device. For example, user television equipment 302 may be Internet-enabled and allow for access to Internet content, while user computer equipment 304 may include a tuner and allow for access to television programming. Media content may have the same layout on the various different types of media devices or may be tailored to the display capabilities of a specific media device. For example, on user computer equipment, the media content may be provided on a website accessed by a web browser. In another example, the media content may be scaled down for wireless user communications devices.

In system 300, there is typically more than one of each type of media device, but only one of each is shown in FIG. 3 to avoid overcomplicating the drawing. In addition, each user may utilize more than one type of media device (e.g., a user may have a television set and a computer) and also more than one of each type of media device (e.g., a user may have a PDA and a mobile telephone and/or multiple television sets).

The user may also set various settings to maintain consistent media content delivery across in-home devices and remote devices. Settings include those described herein, as well as channel and program favorites, programming preferences, display preferences, media content search preferences, and other desirable settings. For example, if a user sets a channel as a favorite on, for example, the website www.tvguide.com on their personal computer at their office, the same channel would appear as a favorite on the user's in-home devices (e.g., user television equipment and user computer equipment) as well as the user's mobile devices, if desired. Therefore, changes made on one media device can change the media content presentation on another media device, regardless of whether they are the same or a different type of media device. In addition, the changes made may be based on settings input by a user, as well as user activity monitored by a media device.

The media devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile device network, cable network, public switched telephone network, any other suitable type of communications network, or a combination of suitable communications networks. Paths 308, 310, and 312 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that, in the exemplary embodiment shown in FIG. 3, it is a wireless path, and paths 308 and 310 are drawn as solid lines to indicate that they are wired paths (although these paths may be wireless paths, if desired). Communications with the media devices may be provided by one or more of these communications paths, but are shown as a single path in FIG. 3 to avoid overcomplicating the drawing.

Although communications paths are not drawn between media devices, these devices may communicate directly with each other via communications paths, such as those described above in connection with paths 308, 310, and 312, as well as other point-to-point communication paths, such as USB cables, IEEE 1394 cables, wireless paths (e.g., Bluetooth, infrared, IEEE 802-11x, etc.), or other short-range communication via wired or wireless paths. The media devices may also communicate with each other indirectly through an indirect path via communications network 314. The media devices may also communicate directly or indirectly with a search system (e.g., search system 100 of FIG. 1) to perform image-based searches related to media content presented on media devices 302, 304, and 306.

System 300 includes media content source 316 and media content data source 318 coupled to communications network 314 via communications paths 320 and 322, respectively. Paths 320 and 322 may include any of the communication paths described above with respect to paths 308, 310, and 312. Communications with media content source 316 and media content data source 318 may be exchanged over one or more communications paths, but are shown as a single path in FIG. 3 to avoid overcomplicating the drawing. In addition, there may be more than one of each media content source 316 and media content data source 318, but only one of each is shown in FIG. 3 to avoid overcomplicating the drawing. If desired, media content source 316 and media content data source 318 may be integrated as one source device. Although communications between sources 316 and 318 with media devices 302, 304, and 306 are shown as through communications network 314, in some embodiments, sources 316 and 318 may communicate directly with media devices 302, 304, and 306 via communications paths (not shown) such as those described above with respect to paths 308, 310, and 312.

Media content source 316 may include one or more types of media distribution equipment including a television distribution facility, cable system headend, satellite distribution facility, programming sources (e.g., television broadcasters), intermediate distribution facilities and/or servers, Internet providers, on-demand media servers, and any other suitable media content providers. Media content source 316 may be the originator of media content (e.g., a television broadcaster, a Webcast provider, etc.) or may not be the originator of media content (e.g., an on-demand media content provider, an Internet provider of video content of broadcast programs for downloading, etc.). Media content source 316 may include cable sources, satellite providers, on-demand providers, Internet providers, or other providers of media content. Media content source 316 may also include a remote media server used to store different types of media content (including video content selected by a user), in a location remote from any of the media devices.

Media content data source 318 may provide media content data, such as media listings, media-related information (e.g., electronic program guide information, broadcast times, broadcast channels, broadcast regions, media titles, media descriptions), metadata, ratings information (e.g., parental control ratings, critic's ratings, etc.), genre or category information, cast information, logo data (broadcasters' or providers' logos, etc.), media format (e.g., standard definition, high definition, etc.), advertisement information (e.g., advertiser names, text, images, media clips, etc.), video-on-demand information, video source information, or any other suitable media content information.

Media content data may be provided to media devices using any suitable approach. In some embodiments, the media device may include a stand-alone media content application that receives media content and media content data via a data feed (e.g., a continuous feed, trickle feed, or data in the vertical blanking interval of a channel). For example, a media device may include an electronic program guide application that receives a media guidance data feed and presents information for television programming available from media content source 316. Media content data may be provided to the media device on a television channel sideband, in the vertical blanking interval of a television channel, using an in-band digital signal, using an out-of-band digital signal, or by any other suitable data transmission technique. Media content data may be provided to a media device on multiple analog or digital television channels. Media content data may be provided to a media device with any suitable frequency (e.g., continuously, daily, a user-specified period of time, a system-specified period of time, in response to a request from a media device, etc.). In some approaches, data from media content data source 318 may be provided to media devices using a client-server approach. For example, a media content application client residing on the media device may initiate sessions with media content data source 318 to obtain media content data when needed. Media content data source 318 may provide media devices 302, 304, and 306 the media content application itself or software updates for the media content application.

The data provided by media content data source 318 may include useful supplemental data associated with media content being presented to a user from media content source 316 on any of media devices 302, 304, or 306. The supplemental data may be useful in identifying or providing context to media content from media content source 316. Information obtained from media content data source 318 may include an episode, scene ID, plot synopsis, network, character, actor cast, video source, advertiser, movie, region, time, or any other suitable information associated with media content from media content source 316. The information may be useful in performing an image-based search using the present invention, as is discussed in more detail below.

Media content system 300 is intended to illustrate a number of approaches, or network configurations, by which media devices and sources of media content and media content data may communicate with each other for the purpose of accessing and providing media content. The present invention may be applied in any one or a subset of these approaches, or in a system employing other approaches for delivering media content. The following three approaches provide specific illustrations of the generalized example of FIG. 3.

In one approach, media devices may communicate with each other within a home network. Media devices can communicate with each other directly via short-range point-to-point communication schemes described above, via indirect paths through a hub or other similar device provided on a home network, or via communications network 314. Each of multiple individuals in a single home may operate different media devices on the home network. As a result, it may be desirable for various media content or settings to be communicated between the different media devices. For example, it may be desirable for users to maintain consistent media content settings on different media devices within a home network, as described in greater detail in Ellis et al., U.S. patent application Ser. No. 11/179,410, filed Jul. 11, 2005. A user may also transmit media content from user computer equipment to a portable video player or portable music player.

In a second approach, users may have multiple types of media devices by which they access media content. For example, some users may have home networks that are accessed by in-home and mobile devices. Users may control in-home devices via a media content application implemented on a remote device. For example, users may access an online media content application on a website via a personal computer at their office, or a mobile device such as a PDA or web-enabled mobile telephone. The user may set various settings (e.g., recordings, reminders, or other settings) on the online media content application to control the user's in-home devices. The online application may control the user's devices directly, or by communicating with a media content application on the user's in-home devices. Various systems and methods for media devices communicating, where the media devices are in locations remote from each other, are discussed in, for example, Ellis et al., U.S. patent application Ser. No. 10/927,814, filed Aug. 26, 2004, which is hereby incorporated by reference herein in its entirety.

In a third approach, users of media devices inside and outside a home can use their media devices to communicate directly with media content source 316 to access media content. Specifically, within a home, users of user television equipment 302 and user computer equipment 304 may access media content source 316 to navigate among and locate desirable media content. Users may also access media content source 316 outside of the home using wireless user communications devices 306 to navigate among and locate media content.

Figure 4:
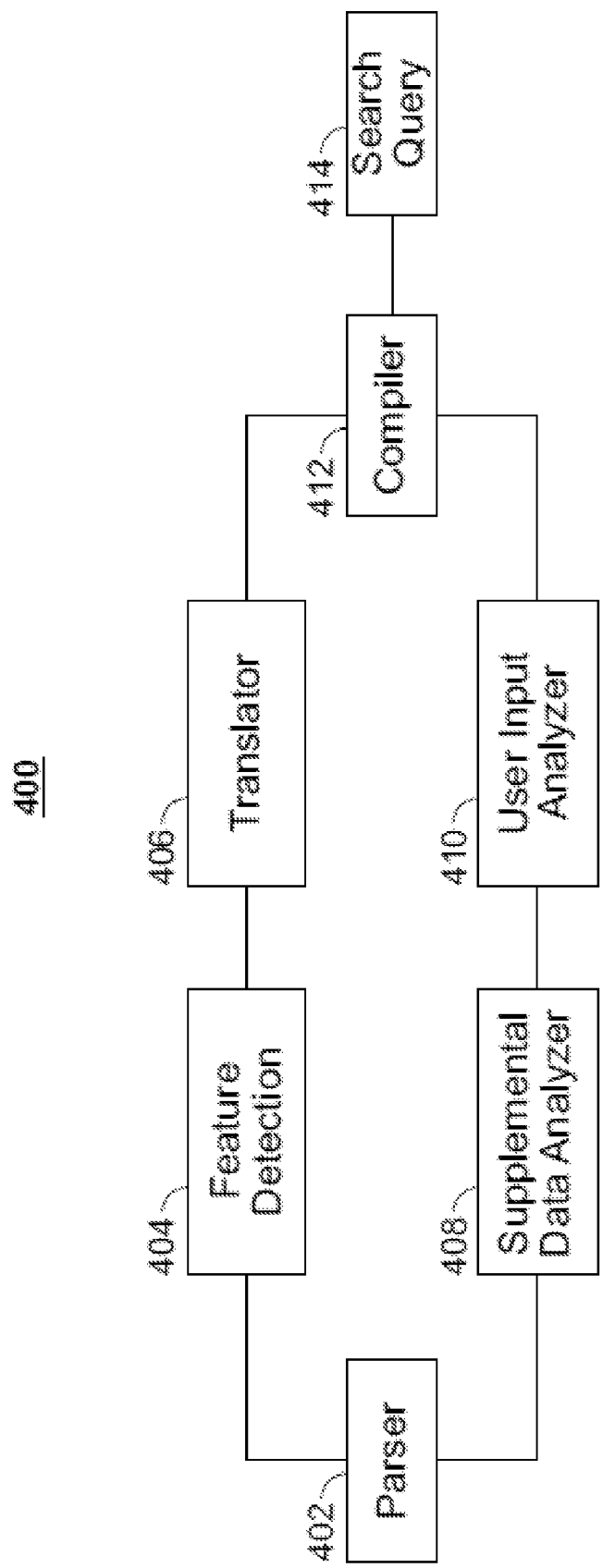
FIG. 4 shows an illustrative processor for use in an image-based searching system in accordance with an embodiment of the present invention.

An illustrative processor 400 for use in an image-based searching system (e.g., search system 100 of FIG. 1) is shown in FIG. 4. Processor 400 may correspond, for example, to processor 106 of FIG. 1. Input to processor 400, including images, supplemental data, and user input, is received by parser 402 and separated into an image component and a data component. The image component includes any image or images captured from media content and sent to processor 400 for use as input into the search system. The data component includes user input and any supplemental data associated with the media content from which the images are captured. The images and data received by parser 402 are processed and combined to produce a search query.

Feature detection 404 receives the image component from parser 402 and analyzes the image to recognize features that may be relevant to the search being performed. Feature detection 404 recognizes features, such as faces, logos, objects, and landmarks, that are likely to be common search targets of a user. Feature detection 404 then highlights the recognized features and provides the recognized features to translator 406. Feature detection 404 may highlight recognized features by isolating the recognized features from the image component, placing indicators on the features in the image component, adding indications of the recognized features to text descriptors for the image component without modifying any images, or by any other suitable approach. Feature detection 404 may also recognize features based on user instructions that dictate the features to be targeted if, for example, processor 400 is deployed in a search system that allows the user to perform targeting manually.

Translator 406 receives the recognized features of the snapshot image and produces text descriptors for the features. The text descriptors may be produced by describing the visual aspects of the recognized features, identifying objects in the recognized features, identifying logos in the recognized features, indicating features of a face included in the recognized features, or by any other suitable approach. The types and detail of the text descriptors produced may depend on the specific recognized features of the image. For example, a descriptor for a common feature, such as a face, may include specific visual descriptors, such as "brown eyes" or "dark hair", rather than a general object descriptor, such as "face". Alternatively, a descriptor for a less common feature, such as a car, may include more general object descriptors, such as "sports car", rather than specific visual descriptors, such as "silver".

The data component extracted from the input by parser 402 is sent to supplemental data analyzer 408. Supplemental data analyzer 408 extracts any information from the supplemental data that may provide useful context information associated with the media content from which the snapshot image is captured. Extracting the information may include reading useful information from a clean profile of information included in the data component or, alternatively, may include mining the data component for useful information embedded, for example, in metadata containing a mix of both useful and nonsensical data sequences. After useful information is extracted from the supplemental data, the data component is sent to user input analyzer 410.

User input analyzer 410 reads any user input included in the data component and extracts information that may be used to further enhance the query for the image-based search. The user input may include information associated with the media content from which the snapshot image is captured that is not contained in the supplemental data if, for example, the media content originates from an external source, such as a personal digital camera or video camera. User input may also indicate preferences of the user related to the specific search being performed by the system. The user input may be used to clarify which features of the snapshot image the user wishes to target for the search. Information extracted from the user input may also be used to determine which portions of the information extracted from the supplemental data are most relevant. For example, if the snapshot image is captured from a television show, the supplemental data may include many different types of information for the show and the episode being viewed. If the user input includes an indication that the user wishes to target a face in the search image, a list of the cast of the show contained in the supplemental data may be determined to be more relevant than other information, such as the time at which the show is broadcast.

After both the image and data components are processed and analyzed, the results are combined at compiler 412. Compiler 412 receives inputs from both the image component processing path and the data component processing path and produces search query 414. Compiler 412 may compare the text descriptors for recognized features of the snapshot image with information extracted from the supplemental data and user input to match portions of the image component with portions of the data component. For example, a text descriptor for a sports car received from the image component processing path may be coupled to an identifier for a car advertiser extracted from the supplemental data and received from the data component processing path. The comparison may dictate which recognized features from the image component are targeted and used in the search query if, for example, information extracted from user input dictates the desired targeted features. The comparison may also dictate which features are targeted if processor 400 is configured to target a recognized feature from the snapshot image only if there is supplemental data related to the recognized feature.

Compiler 412 determines the information extracted from both the image and data components to be targeted and included in the search query and outputs search query 414. Search query 414 includes both search images and supplemental text. The search images included in the search query 414 may be the original snapshot image that is input to parser 402 and may include target indicators for the features determined to be relevant to facilitate a search performed by a search engine using the query. Alternatively, search images included in search query 414 may be isolated portions of the original snapshot image that contain the targeted features. For example, if a single snapshot image contains two targeted features, search query 414 may contain two search images cropped from the original snapshot image, one for each portion of the original snapshot image that contains a targeted feature. The text included in search query 414 may be associated with the search process or the original snapshot image as a whole or, alternatively, may be associated with a specific targeted feature.

Figure 5:
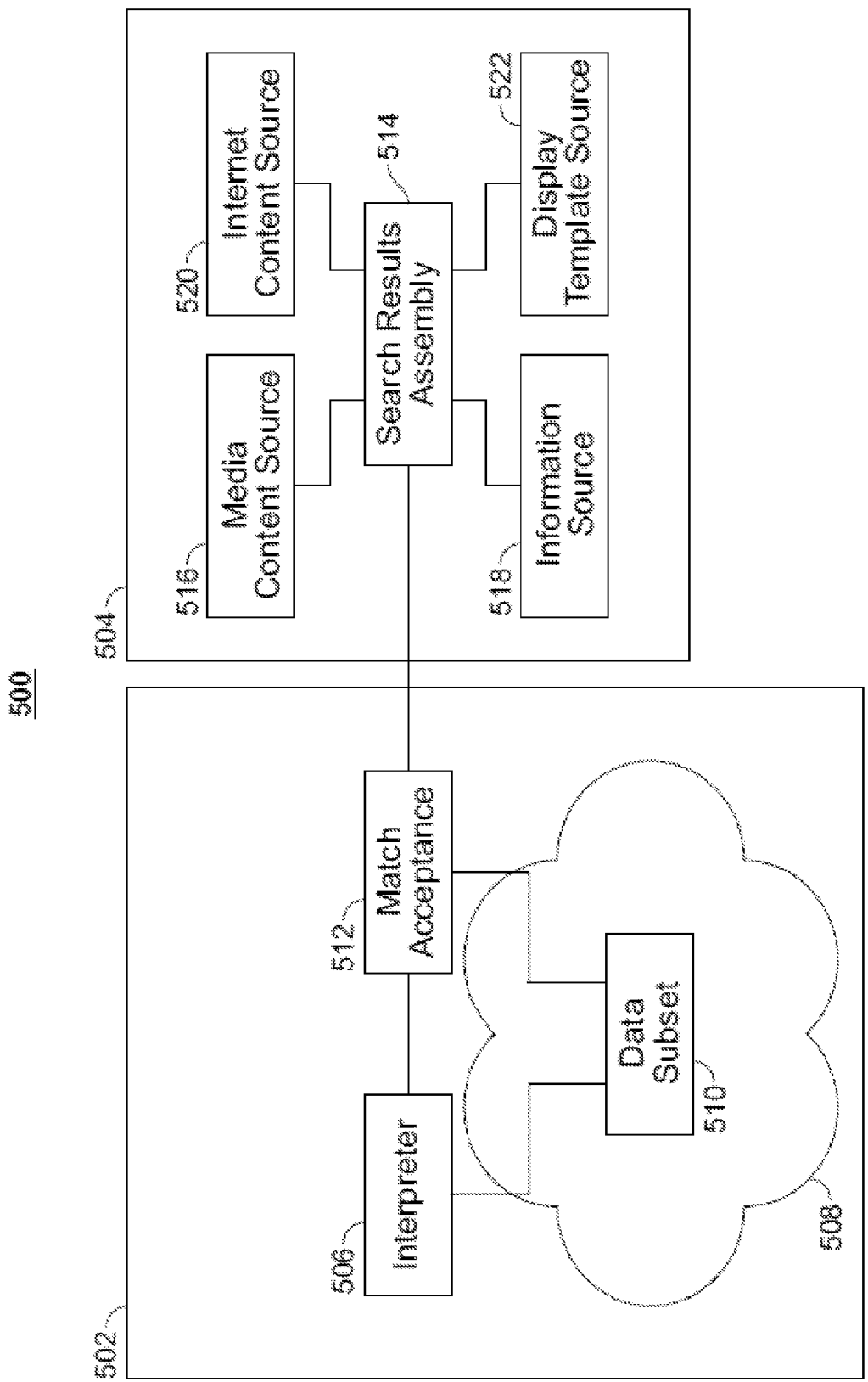
FIG. 5 shows an illustrative search engine for use in an image-based searching system in accordance with an embodiment of the present invention.

An illustrative search engine 500 for use in an image-based searching system (e.g., search system 100 of FIG. 1) is shown in FIG. 5. Search engine 500 may correspond, for example, to search engine 108 of FIG. 1. Search engine 500 includes identifier 502 and results generator 504. A search query containing search images and/or text is received by identifier 502, which interprets the query and performs a search to identify the targeted features of the search query. The identifications are then passed to results generator 504, which locates information, media content, Internet content, or any other relevant content for the identified features. Results generator 504 then creates a display of search results that is presented to the user.

Identifier 502 includes a collection of searchable data 508 that may be used to perform a search based on the received query. Searchable data 508 may include images and/or text descriptors. In some embodiments, searchable data 508 includes images related to media content, and each image is associated with a set of text descriptors that indicate features of the image. For example, searchable data 508 may include a collection of images of actors from movies and televisions shows. Each actor image may have a text descriptor that includes the actor's name and movies or television shows that the actor has appeared in. Searchable data 508 may be a collection of data specific to the searching system in which search engine 500 is implemented, a collection of all available Internet data, a media content database, a collection of data specific to a certain user, any other suitable collection of data, or any suitable combination thereof. Identifier 502 is able to access the searchable data 508 and identify content that potentially matches components of the received search query.

A search query entered to search engine 500 is received by identifier 502 at interpreter 506. The search query received by identifier 502 may have substantially the same features as search query 414 described in the above discussion with respect to FIG. 4. Interpreter 506 analyzes images and reads text descriptors in the received search query to determine how to target and perform the desired search. An efficient search may be performed by identifying potential matches for the targeted features of the snapshot image from a small subset of data rather than trying to identify potential matches from all available searchable data. By analyzing the search query, interpreter 506 may be able to select the small subset of data in order to facilitate the search.

Interpreter 506 may be able to perform the desired search without accessing searchable data 508 using only the information included with the search query. For example, the information included with the search query may be supplemental data that identifies the features of the media content that are targeted for the search. If a user is trying to find the source of media content or the name of a movie being viewed, interpreter 506 may be able to find the source or movie title in supplemental data included in the search query. Interpreter 506 may then send the desired information obtained from the supplemental data directly to match acceptance 512. Interpreter 506 may thus be able to perform a faster search by not sorting through any images or data in searchable data 508 to identify the targeted features of the snapshot image.

If supplemental data does not identify the targeted features of the snapshot image, identifier 502 accesses searchable data 508 to find matches for the targeted features. Matches are found by comparing the images and text descriptors in the search query with images and text descriptors included in searchable data 508.

Identifier 502 may be able to perform the desired search using a small subset of searchable data 508 to identify targeted features in the search query. From a combination of search images, supplemental data, and user input in the search query, interpreter 506 may identify data subset 510 of searchable data 508 to target the search. For example, identifier 502 may query the collection of searchable data 508 using supplemental information received in the search query to collect the relevant data in data subset 510. Identification of data subset 510 can significantly reduce the number of potential matches found and thus can increase the accuracy and speed of the search. For example, if the snapshot image is captured from a television show and contains an actor's face, interpreter 506 may use the targeted face and supplemental information to determine that a search for an actor in a specific show is desired. Interpreter 506 may then use the show title, episode number, scene ID, or cast list from the supplemental information to identify a data subset of all actors who have appeared in the show or, if possible, all actors appearing in the specific episode or scene being viewed. Identifier 502 is then able to identify the face using the small subset of actors in the show rather than searching through all actors included in searchable data 508. If no suitable subset is identified, interpreter 506 may be unable to narrow the search, and identifier 502 may perform the search using all of the searchable data.

Identifier 502 finds potential matches by utilizing a pattern matching algorithm to compare images in the search query with images in searchable data 508. Images obtained from searchable data 508 may be entered into a pattern matching algorithm to compare shapes, colors, features, or any other visual aspects of the images to images of the targeted features in the search query. The patterns and visual aspects of the images used in the comparison may be determined by the types of images being compared. For example, a comparison of two faces may use the color patterns of skin, hair, and eyes as critical features, while a comparison of images of two cars may not use color patterns at all since the same car can be many different colors. The algorithm used to compare the images may then output a measure of the similarity between the patterns found in the images.

Identifier 502 may enter an image from the search query and an image retrieved from searchable data 508 into the pattern matching algorithm to obtain a similarity measure for the images. The image retrieved from searchable data 508 may be selected based on supplemental data in the search query, data associated with the retrieved image, the types of recognizable features contained in the retrieved image, any other suitable criteria, or any suitable combination thereof. For example, if a face is targeted in the search, identifier 502 retrieves images of faces from searchable data 508 and may be able to retrieve only images of faces that appear in the media content indicated in supplemental data. The measurement received from the pattern matching algorithm may be used by identifier 502 to determine if a retrieved image is a potential match for the search query image. Any retrieved image from searchable data 508 that is determined to be a potential match is then sent from identifier 502 to match acceptance 512.

Match acceptance 512 determines whether potential matches found by identifier 502 from searchable data 508 are accepted matches. In some embodiments, images and/or text descriptors included with a potential match may be compared to images and/or text descriptors included for a targeted feature in the search query to determine similarity. Based on the similarity, match acceptance 512 either accepts or rejects a potential match as an accepted match. The determination may be made using a threshold level of similarity, a ranking of potential matches, a measure of similar features contained in images for both the search query and the potential matches, a percentage of keywords contained in text descriptors for both the search query and the potential matches, any other suitable criteria, or any suitable combination thereof. In some embodiments, potential matches may be evaluated using supplemental data. Known information associated with a potential match may be compared with the supplemental data to determine similarity. For example, a potential match known to be from a movie may be compared to a movie title included in the supplemental data. Similarity between the information for the associated match and the supplemental data can be used to determine accepted matches by the same approaches used in comparing potential match images. Match acceptance 512 may perform the determination independently for each targeted feature in the snapshot image. Identification information is then output from identifier 502 for all targeted features for which a accepted match is found.

The identification information for targeted features of the snapshot image is received by results generator 504 at search results assembly 514. Search results assembly 514 uses the identifications to gather information, media content, Internet content, and any other suitable content to present to the user as search results. The search results may include content obtained from different types of sources, and the types of sources may be determined based on the identified features of the search image. For example, content for an identified actor may include a biography and television programming containing the actor, while content for an identified wristwatch may include Internet shopping results for the watch and local retail outlets selling the watch. All gathered content is then collated into a single search results assembly and presented to the user.

Results generator 504 includes media content source 516 that may be accessed by search results assembly 514. Media content source 516 may include any suitable media content types, including all media content discussed above with respect to media content source 316 of FIG. 3. Search results assembly 514 may retrieve media content from media content source 516 to include in the search results presented to the user based on the targeted feature identifications received from identifier 502. For example, if identifier 502 sends identification of an actor in a search image to results generator 504, search results assembly 514 may retrieve movie clips or television shows starring the identified actor from media content source 516. The retrieved media content may be included with the search results as a video clip embedded in the search results display, a link to the media content, an option to tune to current broadcast programming, an option to record the media content during a future broadcast, or by any other suitable approach.

Results generator 504 also includes information source 518 that may be accessed by search results assembly 514. Information source 518 may include any suitable type of information, including the media content information discussed above with respect to media content data source 318 of FIG. 3. Information source 518 may include caches of media content information specific to the searching system in which search engine 500 is utilized. For example, if search engine 500 is part of a cable provider's media delivery system, information source 518 may include information related to all media content available through the cable provider. Search results assembly 514 may retrieve information from information source 518 to include in the search results presented to the user based on the targeted feature identifications received from identifier 502. For example, if identifier 502 sends identification of an actor in a search image to results generator 504, search results assembly 514 may retrieve a biography of the actor or ordering information for video-on-demand programs with the actor from information source 518.

Results generator 504 also includes Internet content source 520 that may be accessed by search results assembly 514. With the large amount of media content and information available on the Internet, Internet content source 520 may provide relevant media content and information that is not available in media content source 516 or information source 518. For example, media content source 516 may contain all media content available through a given cable provider and information source 518 may contain information related to the media content contained in media content source 516. Search results assembly 514 may retrieve information and media content that is not available through the cable provider from Internet content source 520 to supplement the results presented to the user. Media content retrieved from Internet content source 520 may be presented directly to the user with the search results, or may be presented to the user as a link that the user may select to navigate to a website using an external web browser.

Results generator 504 also includes display template source 522 that may be accessed by search results assembly 514. Search results assembly 514 may retrieve a display template from display template source 522 to use to present all search results retrieved from media content source 516, information source 518, Internet content source 520, and any other suitable search results. The display template chosen by search results assembly 514 may be based on the number of search results, the types of search results, the approach used to present the results to the user (e.g., presenting results on a media device or by email), user preferences, the searching system in which search engine 500 is utilized, or any other suitable criteria.

The search results gathered by search results assembly 514 are collated and sent to the user. The search results may be sent to a media device (e.g., media device 102 of FIG. 1) to be displayed. The search results may be sent to a controller (e.g. controller 104 of FIG. 1) of a media device to be displayed. The device on which the search results are displayed may not be the device from which the search was initiated. For example, a user may initiate a search on a media device controller, and the search results may be presented on the media device itself. The search results may also be sent from results generator 504 to be presented to the user on an external device (e.g., a PC), by email, through a web browser, or by any other suitable approach.

Figure 6A:
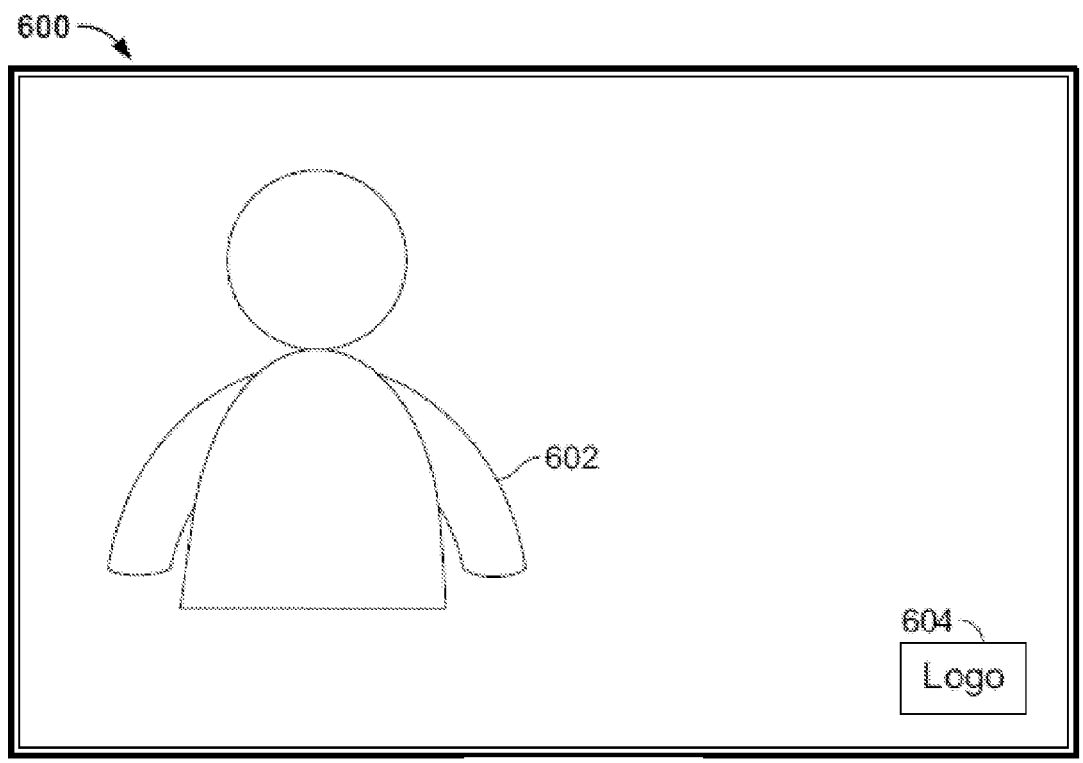
FIGS. 6A-C show an illustrative image-based media content search in accordance with an embodiment of the present invention.
Figure 6B:
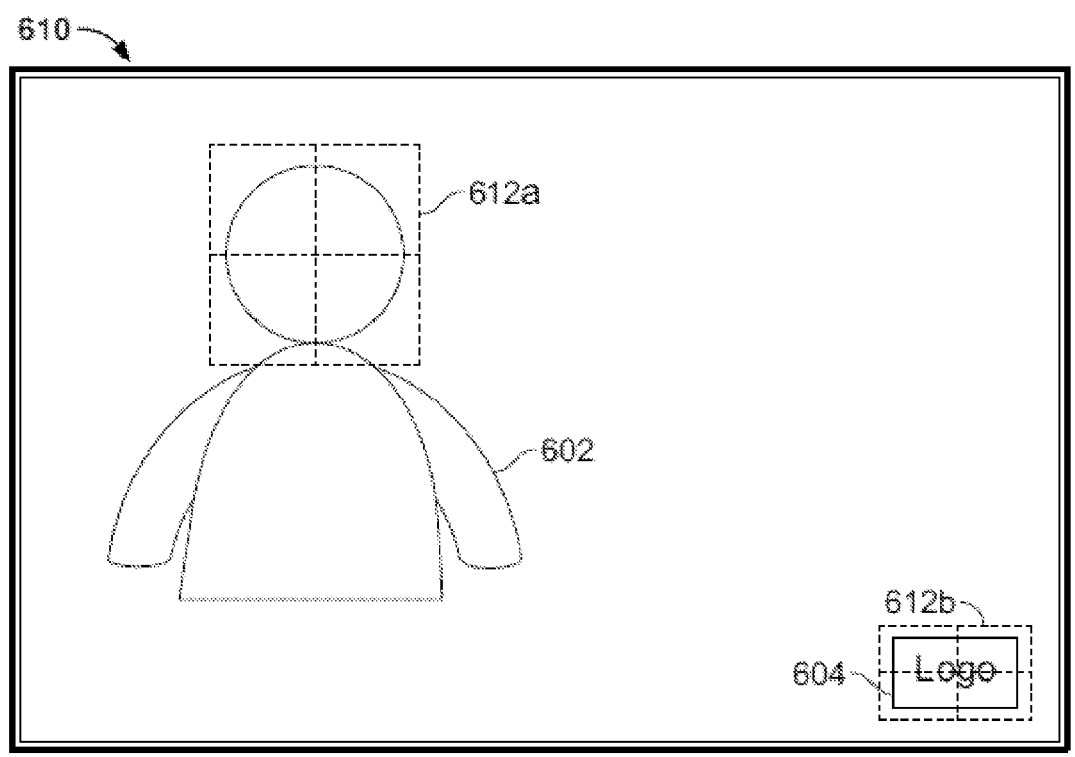
Figure 6C:
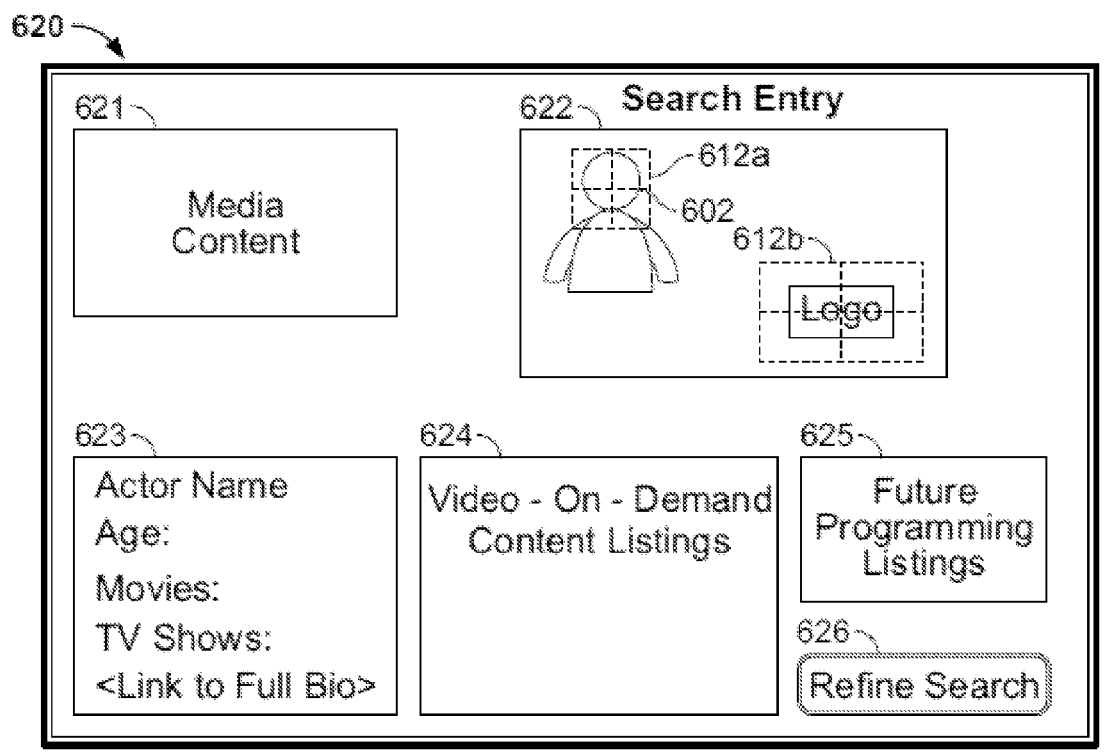

An illustrative image-based media content search performed using the present invention is shown in FIGS. 6A-C. While viewing media content, a user may wish to perform a search related to the media content. The desired search may be to identify an actor, identify a movie or show, identify an object on screen, find the source of the media content, or any other suitable search. For the purpose of illustration and not limitation, the search process is described herein with respect to a search to identify an actor on screen, but the search process may be applied for any other suitable search.

FIG. 6A shows media content presented to a user on display 600 of a media device. The media device may be any suitable type of device, including media devices discussed above with respect to FIGS. 2 and 3. In the embodiment shown, the media content presented on display 600 is a television show, and the user wishes to identify actor 602 who appears in the show. To initiate the search, the user captures a snapshot image of display 600 when actor 602 is on screen. The snapshot image may be captured by any suitable device, including the media device or a controller for the media device, and by any suitable approach, including the approaches described above with respect to FIG. 1. In addition to actor 602, there may be other features of display 600, such as logo 604 or other actors in the show, present in the snapshot image. These additional features of the snapshot image may or may not be useful to supplement the search performed for actor 602.

FIG. 6B shows snapshot image 610, which is captured from display 600 (FIG. 6A) and sent to a search system. The system analyzes the snapshot image and identifies features of the snapshot image that can be targeted for a search. Targeting features may include recognizing the presence of faces, such as the face of actor 602, in the snapshot image. The system may isolate the face of actor 602 and place target feature indicator 612a on the face. Targeting features may also include recognizing the presence of logos, such as channel logo 604, in the snapshot image. Logos may be a channel logo in the corner of the screen, a brand label logo on an item of clothing, or any other suitable logo. The system may isolate channel logo 604 and place target feature indicator 612b on the logo. Targeting features may also include recognizing objects within the image. Any recognized objects are isolated and, if possible, identified by the system. Recognizable objects may include retail items, clothing, landmarks, items in the background of a scene, or any other suitable objects that may be recognized. The system may place a target feature indicator similar to target feature indicators 612a and 612b on any recognized objects (not shown). Targeted features may also be indicated by the search system in text descriptors without placing any indicators on the snapshot image. The text descriptors may then be send to a search engine with an unmodified copy of the snapshot image.

The search system may also allow the user to manually perform targeting of features in the snapshot image. An unmodified copy of the captured snapshot image may be presented to the user, and the user may indicate targeted features using a suitable user input interface. The search system may then place target feature indicators on the snapshot image or create text descriptors that include indications of the targeted features.

The system also analyzes user input received with snapshot image 610. User input may contain information about the media content from which snapshot image 610 was captured. The information may be sent with a targeted search image to be used by a search engine. User input may also indicate the user's preferences for the search. For example, snapshot image 610 may include multiple recognizable objects. User input provided along with snapshot image 610 may indicate that the user is trying to target a face and identify actor 602. The system will read the user input and, after recognizing both the face of actor 602 and the other recognizable objects, may place target feature indicators over only the face and the channel logo since the other objects are not likely to be useful in identifying actor 602.

The system also analyzes supplemental data received with snapshot image 610. The supplemental data may provide useful information about the media content from which snapshot image 610 is captured. The user may or may not be aware of supplemental data provided to the system. For example, the supplemental data may include a show name, television network, and broadcast time that the user is aware of, as well as a full list of all actors in the episode of the show, which is unknown to the user. The system may use the supplemental data to determine the features of snapshot image 610 that should be targeted and sent to a search engine. By matching information from the supplemental data with targeted features in the image, the system can provide a detailed search query to a search engine to facilitate an effective search.

The system creates a search query to send to a search engine. The search query is a mix of images and text taken from snapshot image 610, information extracted from user input, information extracted from supplemental data, and any other text descriptors related to the targeted features of snapshot image 610. The system may be able to group portions of the search query together to facilitate the search performed by the search engine. For example, portions of the user input and supplemental data may be associated with a specific targeted feature of snapshot image 610 to make the search more efficient.

A search engine performs a search based on the search query and identifies the targeted features of snapshot image 610. Using any descriptors or supplemental information provided with the search query, the search engine may target the search using a data subset and efficiently identify the targeted features, such as actor 602. Once a potential identity of actor 602 is found, images for the actor with that identity are retrieved by the search engine and compared to the portion of snapshot image 610 isolated by targeted feature indicator 612a. If the similarity between the retrieved images and snapshot image 610 is satisfactory, the search engine accepts the known identity of the actor in the retrieved images as the identity of actor 602. The identity of actor 602 is then used to retrieve information, media content, Internet content, or any other suitable content related to actor 602 to include in a search results display.

The search results generated by the search engine are presented to the user in results display 620 of FIG. 6C. Results display 620 may be presented to the user on the same media device as display 600 (FIG. 6A), a controller for the media device, a different media device, by email, in a web browser, or by any other suitable approach.

Media content window 621 of the display is used to continue presenting the media content from which snapshot image 610 (FIG. 6B) was captured while the user navigates the search results. The user may select media content window 621 to hide the search results and display the media content in a full screen view. If media content window 621 is showing live television programming, the user may change channels or perform any other suitable control function for the media content without affecting the search results displayed in results display 620.

Search entry 622 of the display is used to present the image used to obtain the search results. Search image 622 may correspond, for example, to snapshot image 610 (FIG. 6B), and may show the user the targeted feature indicators 612a and 612b that were used to formulate the search query sent to the search engine. Search entry 622 may be interactive and allow the user to adjust the targeted feature indicators, for example, to refine the search performed.

Summary 623 provides the user with a quick profile of the determined identity of actor 602. Summary 623 may include the name and age of actor 602, movies and shows starring actor 602, and any other suitable information. Summary 623 may also include a link to a full biography for actor 602 that the user may select to view more detailed information about actor 602.

Additional media content containing appearances by actor 602 is provided to the user in results display 620 as video-on-demand content 624 and future programming 625. Additional media content may also include recorded content, current programming, or any other suitable type of media content. The user may select any of the listings of video-on-demand content 624 to purchase the media content or any of the listings of future programming 625 to set a reminder for the programming or schedule the programming to be recorded.

The user may wish to refine the image search if the results retrieved are not of interest to the user or if the user intended to perform a different search. The user can refine the search by selecting option 626 and adjusting the targeted features, providing user input to narrow the search, responding to clarifying questions, or performing any other suitable function to refine the search. In addition, the user may manually move and adjust the targeted feature indicators in search image 622 to indicate the desired features the user would like to target in the new search. The user may then select option 626, and the system will perform a new search using the new set of targeted features indicated by the user.

The process that begins with capturing snapshot image 610 (FIG. 6B) from display 600 (FIG. 6A) and ends with presenting results display 620 (FIG. 6C) to the user may rely on a large amount of supplemental data being provided to the search system along with snapshot image 610. If little or no supplemental data is provided, finding matches for targeted features of snapshot image 610 may be difficult. For example, if a face is identified in snapshot image 610 and no supplemental data is available to provide context for snapshot image 610, it may be difficult to match the face to another face contained in a large set of all searchable faces. The system may return a false match for the face from the large set of all searchable faces. By taking any available supplemental data, the system can give context to the snapshot image used for targeting features and searching, and can thus maximize the effectiveness of the search process.

Figure 7:
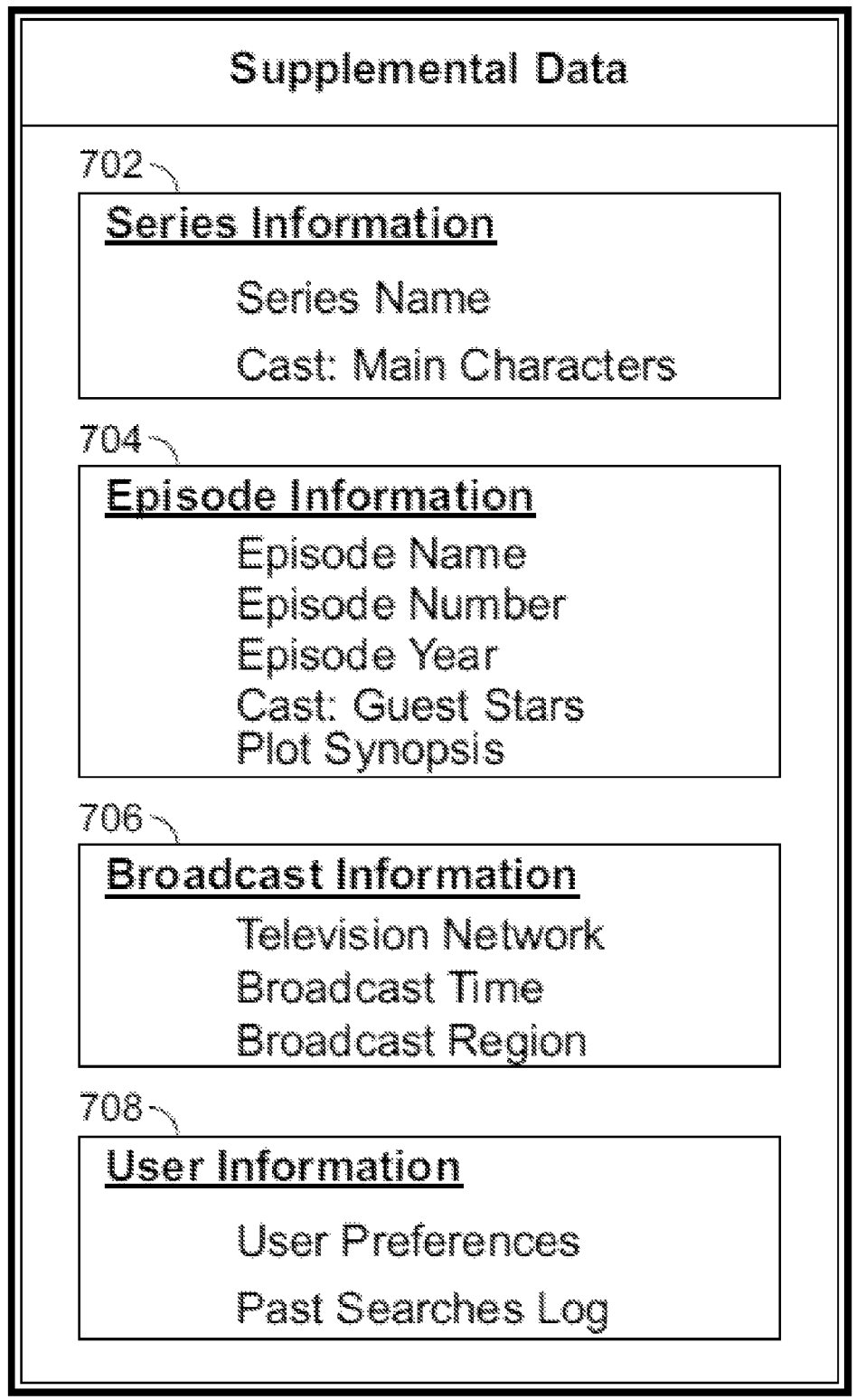
FIG. 7 shows an illustrative profile containing supplemental information for a snapshot image in accordance with an embodiment of the present invention.

FIG. 7 shows an illustrative profile of information that may be provided as supplemental data with a snapshot image (e.g., snapshot image 610 of FIG. 6B). For the purpose of illustration and not limitation, profile 700 contains information for a snapshot image captured from a broadcast television program, but may alternatively contain information for any snapshot image captured from any type of media content. Profile 700 includes program information for the television program from which the snapshot image is captured and user information for the user capturing the snapshot image. The types of information shown in profile 700 are merely illustrative, and the supplemental data may include a combination of any information shown or any other suitable information.

Series information section 702 of profile 700 contains identifying information for the television series associated with the broadcast television program being viewed by the user. The section includes the series name, which may be used for targeting during a search. A search engine may recognize the series name and perform a search using a subset of all searchable data to find matches for targeted features of a snapshot image. For example, if a search system includes a database of data for all television series available through the system, the search engine can target the search to the section of the database specific to the named television series. Series information section 702 also contains a listing of the main characters in the cast for the series. The listing may include both character names and the names of the actors who play the characters. The names contained in the cast listing can be used to target a search to identify a face in a search image. For example, if a face is included in a captured snapshot image, a search engine can search only faces of characters and actors in the cast of the show, rather than all possible faces of characters and actors in all shows.

Episode information section 704 of profile 700 includes identifying information for the specific episode of the television series currently being viewed by the user. The episode name, number, and year can further narrow a search for which there is a large amount of data available for the television series. For example, a series that has been on television for many years may have many different episodes and a large amount of data available in a media content database. Using the episode identification information, the search engine can search only the data related to the specific episode being viewed. The system may then search the full set of data for the television series only if matches for targeted features are not found in the data specific to the episode. The list of guest stars in the episode can be used similar to the main character cast listing of the series information section 702 to identify characters and actors in a snapshot image. The guest stars list contains characters that only appear in the specific episode being viewed or in a small number of episodes and thus can be useful in targeting a search to identify a minor character or an actor appearing in a cameo. The plot synopsis contains a summary of the storylines for the episode. The synopsis may be useful in searching if one of the targeted features is a main component of the episode, such as an object that is part of a main storyline and shows up in many scenes. The synopsis may also be useful in evaluating potential matches, for example, by matching keywords in the synopsis with key words in a text description of a potential match.

Broadcast information section 706 of profile 700 includes a network, broadcast time, and broadcast region that are specific to the broadcasting occurrence from which the snapshot image is captured. For a recurring broadcast, such as a news show, or a duplicate broadcast, such as an episode rerun, the broadcast information section 706 may specify the occurrence of the broadcast from which the snapshot image was captured. The specific broadcast occurrence may be useful for searches related to advertisers or commercials that were only shown during that occurrence. In addition, the broadcast region may be used as a general indication of a user's location to present search results specific to the user. An example of presenting search results based on a user's location is discussed in more detail below with respect to FIG. 8D.

User information section 708 of profile 700 includes information that can be used to tailor a search and the presentation of search results to a specific user of the search system. The user preferences in user information section 708 may dictate the types of searches performed by the system or the appearance of the search results displays presented to the user. User preferences may be explicitly configured by the user or may be determined by monitoring past actions of the user. A log of information related to past searches for the user may also be maintained and used to dictate the types of searches performed or the appearance of search results displays.

In some embodiments, a search for Internet content may be preferable. The search may be performed for only Internet content, or Internet content may be retrieved and presented along with media content results, or results of any other suitable type. An Internet content search may be preferable if, for example, the media content being viewed by a user is from an Internet source. An Internet search may also be preferable if a targeted feature in a captured snapshot image is unrelated to the media content, such as a snapshot image captured from an advertisement shown during a commercial break in a television program.

An illustrative image-based Internet content search is shown in FIGS. 8A-D. For the purpose of illustration and not limitation, the search is described herein with respect to a search to identify a car in a snapshot image captured from a television commercial, but alternative embodiments may include any suitable snapshot image captured from any suitable media content.

Figure 8A:
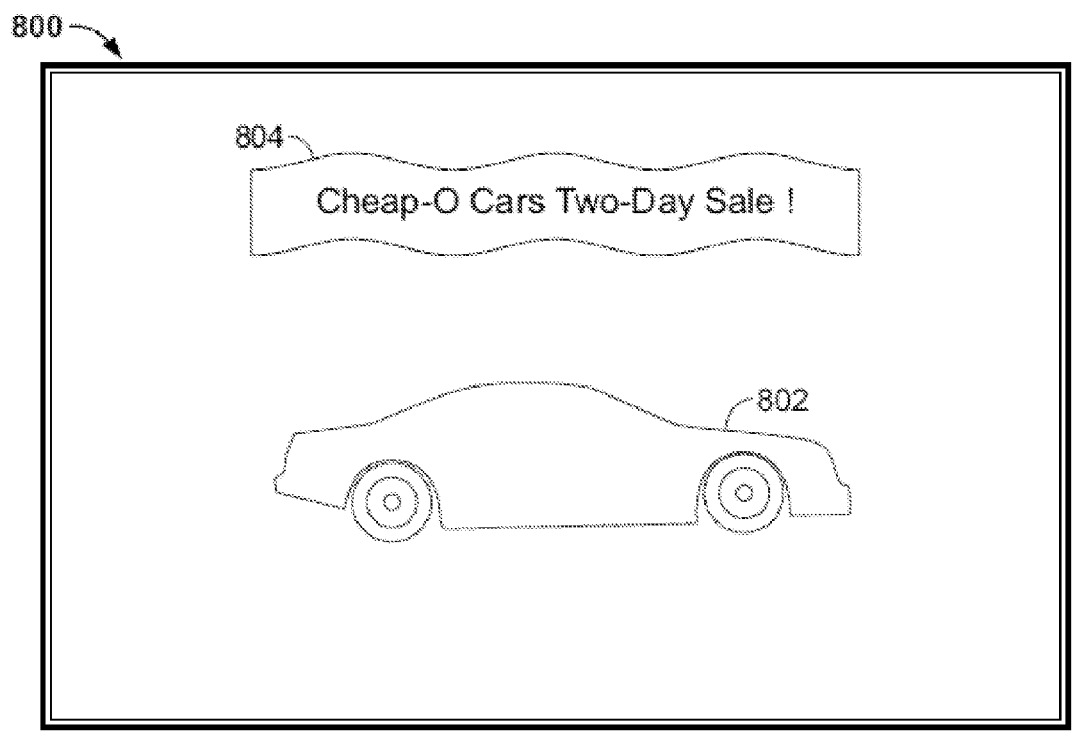
FIGS. 8A-D show an illustrative image-based Internet content search in accordance with an embodiment of the present invention.

In FIG. 8A, broadcast television programming is presented to a user on display 800 of a media device. The media device may be any suitable type of device, including media devices discussed above with respect to FIGS. 2 and 3. A car commercial is shown during a commercial break in the programming being viewed by the user. The user may wish to perform a search based on the commercial, for example, to identify car 802 shown in the commercial or to find local retailers selling car 802. To initiate the search, the user captures a snapshot image of display 800 when car 802 is on screen. The image may be captured by any suitable device, including the media device or a controller for the media device, and by any suitable approach, including the approaches described above with respect to FIG. 1. In addition to car 802, there may be other features of display 800, such as banner 804, present in the snapshot image. These additional features of the snapshot image may or may not be useful to supplement the search performed for car 802.

Figure 8B:
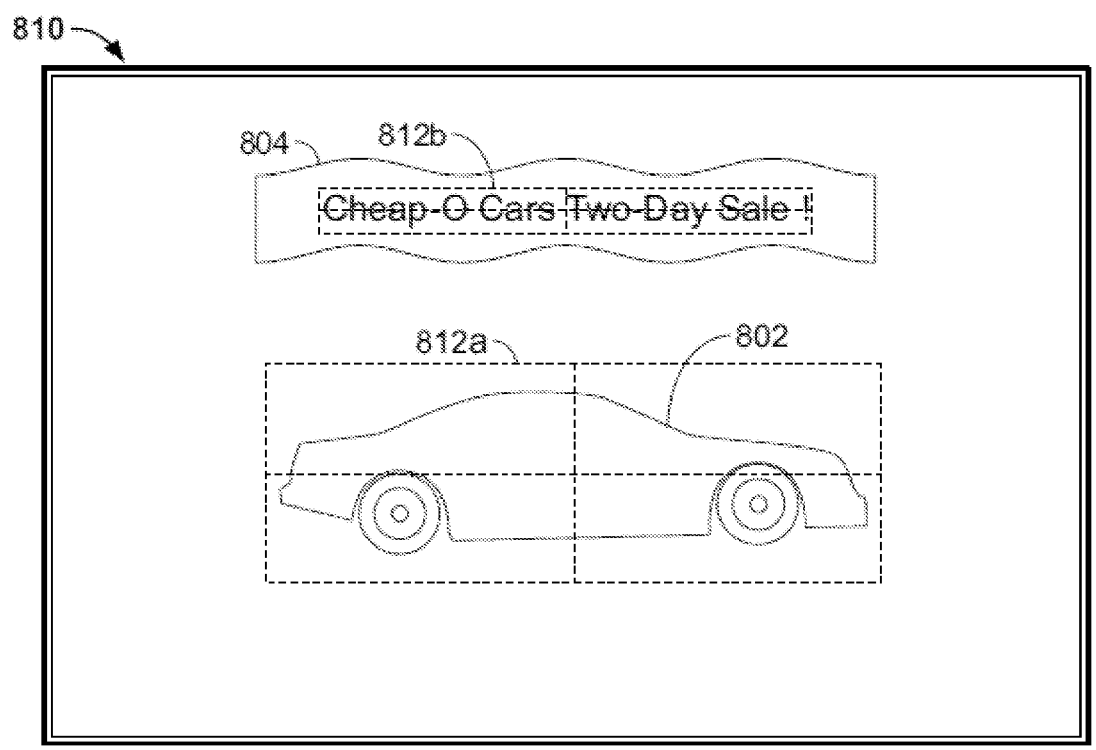
Figure 8C:
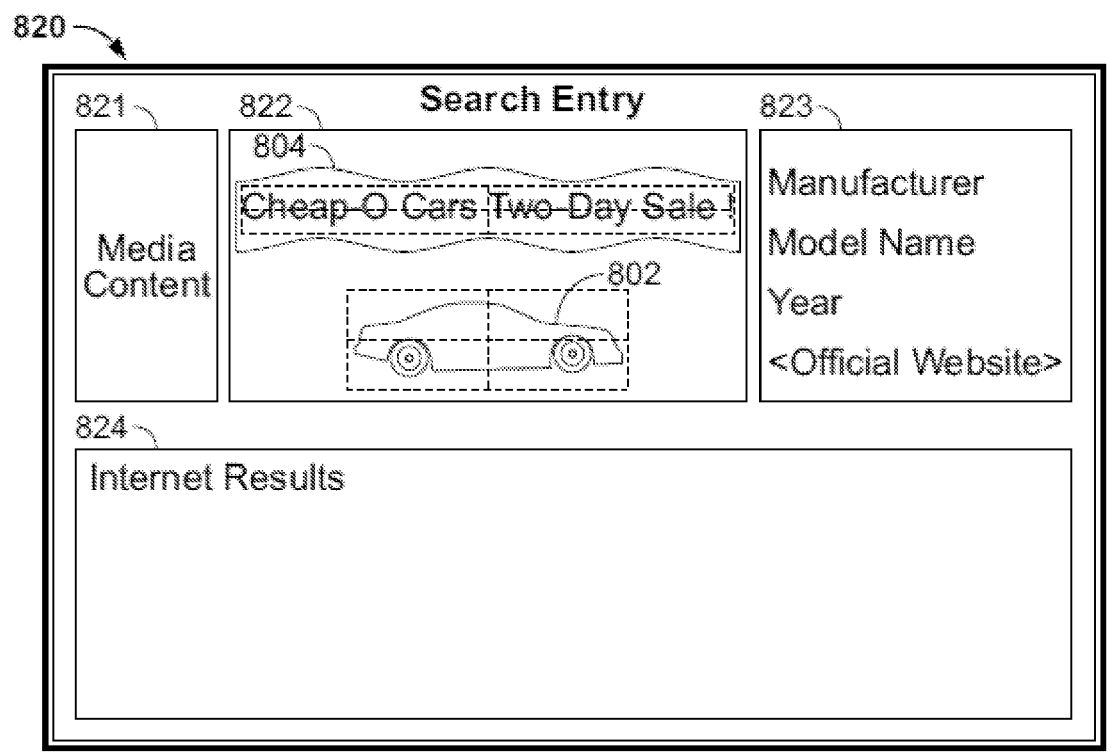

FIG. 8B shows snapshot image 810, which is captured from display 800 (FIG. 8A) and sent to a search system. The system analyzes the snapshot image and recognizes features of the image that can be targeted for a search. The system recognizes car 802 as a recognizable object in the image and may place targeted feature indicator 812a on the object. Car 802 is then isolated, and the system identifies the object as a car and creates a text descriptor for the car to be included in a search query. The text descriptors may identify visual characteristics of the car, such as color or size. The system also recognizes the words in banner 804 and may place targeted feature indicator 812b on the words. The words are then isolated, and the system reads the words and converts them to a text descriptor to be included in the search query. Car 802 and the words in banner 804 may also be targeted manually by the user.

The search system also analyzes user input received with snapshot image 810. The user input may indicate that the user wishes to receive Internet results or car retail results, causing the search system to perform the search to retrieve Internet content. If there are multiple recognizable objects in snapshot image 810, user input may indicate that the user wishes to search based on car 802 or text in banner 804, and these features of snapshot image 810 are targeted for the search.

The search system also analyzes supplemental data received with snapshot image 810. The supplemental data may provide useful information about the commercial from which snapshot image 810 is captured. For example, the supplemental data may identify the advertiser that sponsors the commercial. The advertiser of the commercial may be associated with a car manufacturer. Information about the advertiser or the car manufacturer may be useful in identifying the type and model of car 802. The information contained in the supplemental data may be used for a determination made by the search system to target car 802 and the text in banner 804 and not target other features of snapshot image 810. Supplemental data related to car 802, such as the car manufacturer, if known, can be linked with target feature indicator 812a and supplemental data related to the text in banner 804, such as the advertiser, if known, can be linked with target feature indicator 812b. The linking of target features and supplemental data can be used to create a more specific and effective search query.

After snapshot image 810, user input, and supplemental data is analyzed, a search query is created, and a search engine performs a search based on the search query to identify the targeted features of snapshot image 810. The search engine uses provided search images and text descriptors to identify the type and model of car 802 and the sale being advertised by the words in banner 804. Potential matches for car 802 are evaluated by determining a similarity between images and text descriptors for the potential matches and the portion of snapshot image 810 isolated by targeted feature indicator 812a and text descriptors in the search query. When a potential match is determined to have suitable similarity, it is accepted as the type and model of car 802. A text recognition portion of the search engine may read the words on banner 804 and identify "Cheap-O Cars" as the name of a retailer and the rest of the banner as an indication of a current sale. The identification information for car 802 and the information read from banner 804 are then used to locate Internet content related to car 802 and retail information.

The Internet content and information retrieved by the search system is presented to the user in results display 820.

Results display 820 may be displayed on any suitable device using any suitable approach, including the devices and approaches discussed above with respect to results display 620 of FIG. 6C.

Media content window 821 of results display 820 is used to continue presenting the media content from which snapshot image 810 (FIG. 8B) was captured while the user navigates the search results. The features of media content window 821 may be substantially the same as those discussed above with respect to media content window 621 of FIG. 6C. Search entry 822 of the display is used to present the image used to obtain the search results. The features of search entry 822 may be substantially the same as those discussed above with respect to search entry 622 of FIG. 6C.

Summary 823 provides the user with a quick profile of information for car 802. The profile includes the model, manufacturer, and year of car 802 and also includes a link to the official page for car 802 on the manufacturer's website. The user may select the link to navigate to the website and view a full detailed information sheet for car 802.

Internet results field 824 includes listings of information, websites, and any other suitable Internet content related to car 802 and banner 804. The Internet results may include links to websites or other external content sources that the user may select to navigate to the external sources using, for example, a web browser. Content contained in Internet results field 824 may include information about car 802 or the car retailer advertised in banner 804. Results may also include retail prices, retail locations, retail websites, special deals, or any other retail information related to car 802 or the advertised car retailer.

Figure 8D:
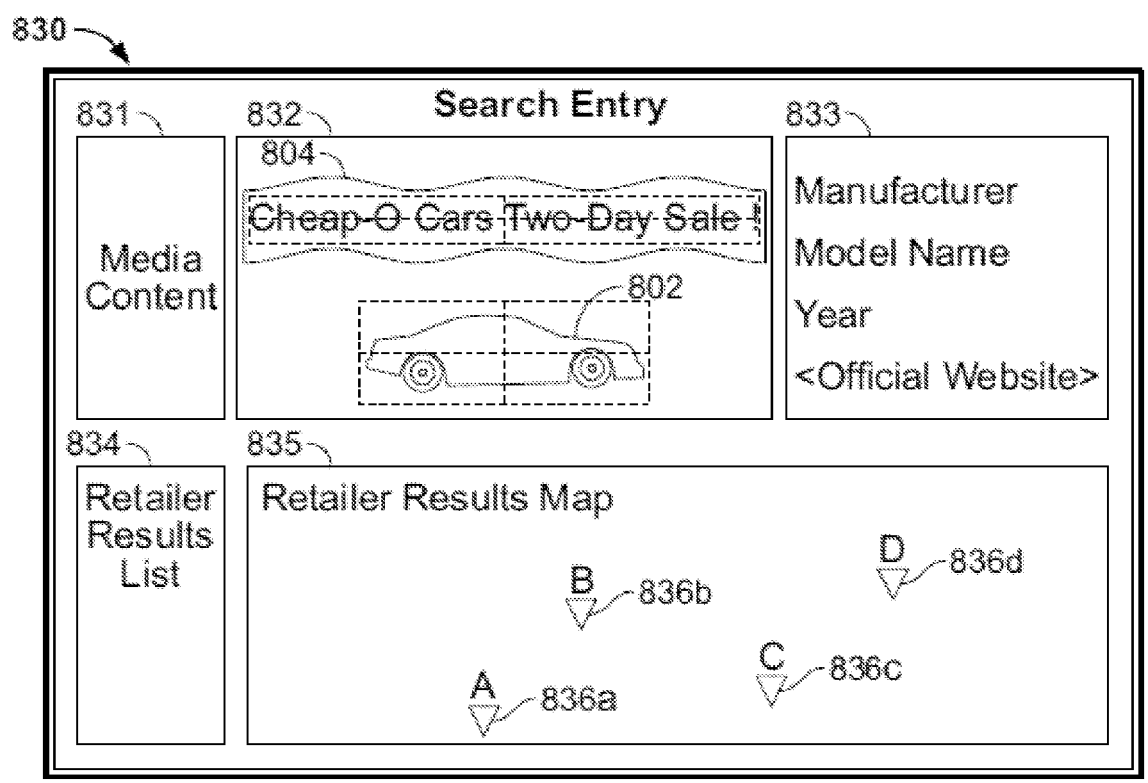

The location of a user performing a search for the car shown on display 800 in FIG. 8A may also be used to obtain Internet content results. FIG. 8D shows results display 830 used to present results from an Internet content search based on a user's location and snapshot image 810 of FIG. 8B. Media content window 831, search entry 832, and summary 833 of results display 830 may have substantially the same features as media content window 821, search entry 822, and summary 823, respectively, of results display 820 in FIG. 8C.

In addition to the targeted features discussed above with respect to snapshot image 810 of FIG. 8B, the search run to produce results display 830 is also based on the location of the user. The location of the user may be provided to the search system directly by the device used to initiate the search or, alternatively, may be estimated based on a broadcast region indicated in supplemental data provided with the snapshot image. Using the location of the user, the search system identifies retailers in the user's area that sell cars similar to car 802. The identified retailers may be the retailer indicated in banner 804, or may be any other retailer who carries cars similar to car 802.

Identified retailers are listed in results list 834. The retailers may be listed with any relevant retail information, such as location, distance from the user's location, prices, cars in stock, and any other suitable retail information. Retailers in the list that match the retailer advertised in banner 804 may be visually differentiated (e.g., highlighted) from other retailers in the list. In addition to results list 834, the identified retailers are shown on results map 835. Results map 835 shows a map of the area surrounding the user. Tags 836*a-d* are placed on results map 835 to indicate the locations of retailers listed in results list 834. Each tag on results map 835 corresponds to a retailer in results list 834 and is placed at the location for the corresponding retailer. Tags for retailers on the map that match the retailer advertised in banner 804 may be visually differentiated from all other retailers in the list. Both results list 834 and results map 835 may be interactive and allow the user to scroll, zoom, or perform any other suitable navigation through the list or map. If the user wishes to obtain more information about a specific retailer, he or she may access additional information by selecting the name of the retailer in results list 834 or selecting the tag for the retailer from results map 835.

In some embodiments, interaction between the search system and the user may govern the type of search run and the targeted features used for the search. Interaction between the search system and the user may be preferable when there are multiple different features of a snapshot image that can be used for a search and a determination regarding which features to use is required. The multiple features may be similar features, such as multiple objects of the same type, and a determination may be made regarding which of the multiple objects to use. In addition to any user input provided when a snapshot image is captured, the search system may receive user input in response to questions or options presented to the user. The system may also receive user input after a search is run that indicates the user's intentions to refine the search. The user input may be received using any suitable approach and may be received both in response to and in the absence of prompts presented to the user by the system.

An illustrative image-based search controlled by interaction between the user and the search system is shown in FIGS. 9A-D. For the purpose of illustration and not limitation, the search process is described herein with respect to a search to identify an actor on screen in a television show or movie, but alternative embodiments may include searches performed for any suitable type of media content presented on any suitable media device using any suitable targeted features.

Figure 9A:
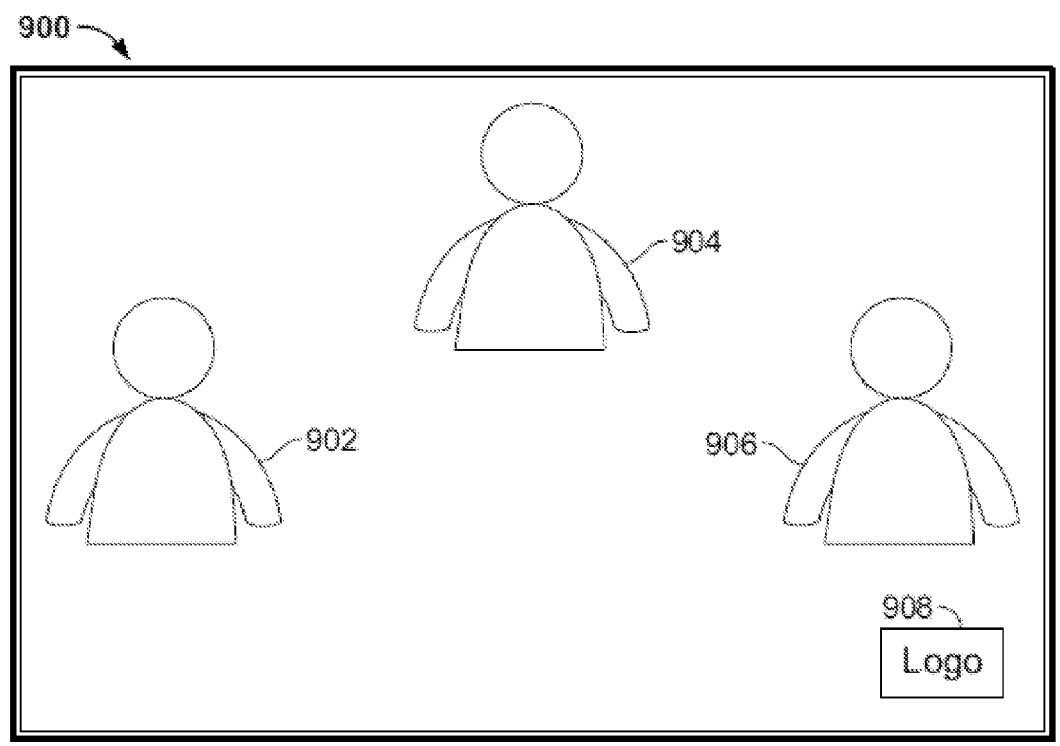
FIGS. 9A-D show an illustrative image-based search controlled by interaction between a user and a search system in accordance with an embodiment of the present invention.

FIG. 9A shows media content presented to a user on display 900 of a media device. The media device may be any suitable type of device, including media devices discussed above with respect to FIGS. 2 and 3. The media content presented on display 900 is a movie, and the user wishes to identify actor 902 who appears in the movie. To initiate the search, the user captures a snapshot image of display 900 when actor 902 is on screen. The image may be captured by any suitable device, including the media device or a controller for the media device, and by any suitable approach, including the approaches described above with respect to FIG. 1. In addition to actor 902, there may be other features of display 900, such as actors 904 and 906 and logo 908, present in the snapshot image. These additional features of the snapshot image may or may not be useful to supplement a search performed to identify actor 902. The additional features may also be useful as targeted features for separate searches, such as searches to identify actors 904 and 906.

Figure 9B:
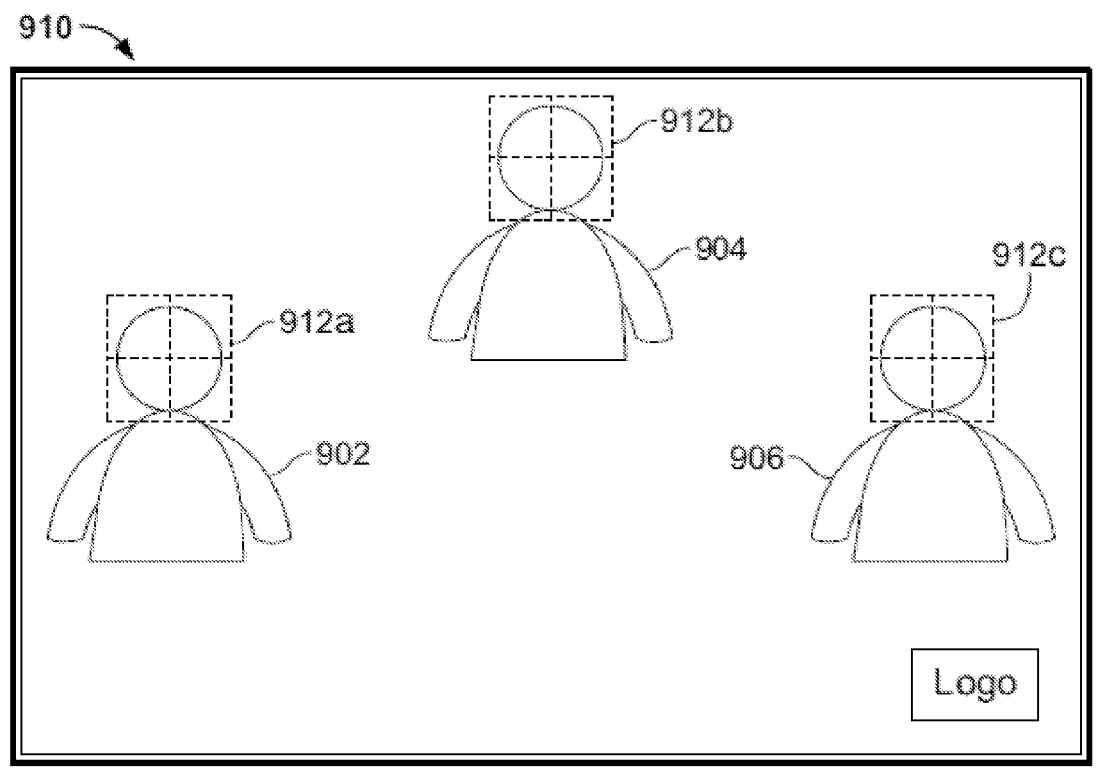
Figure 9C:
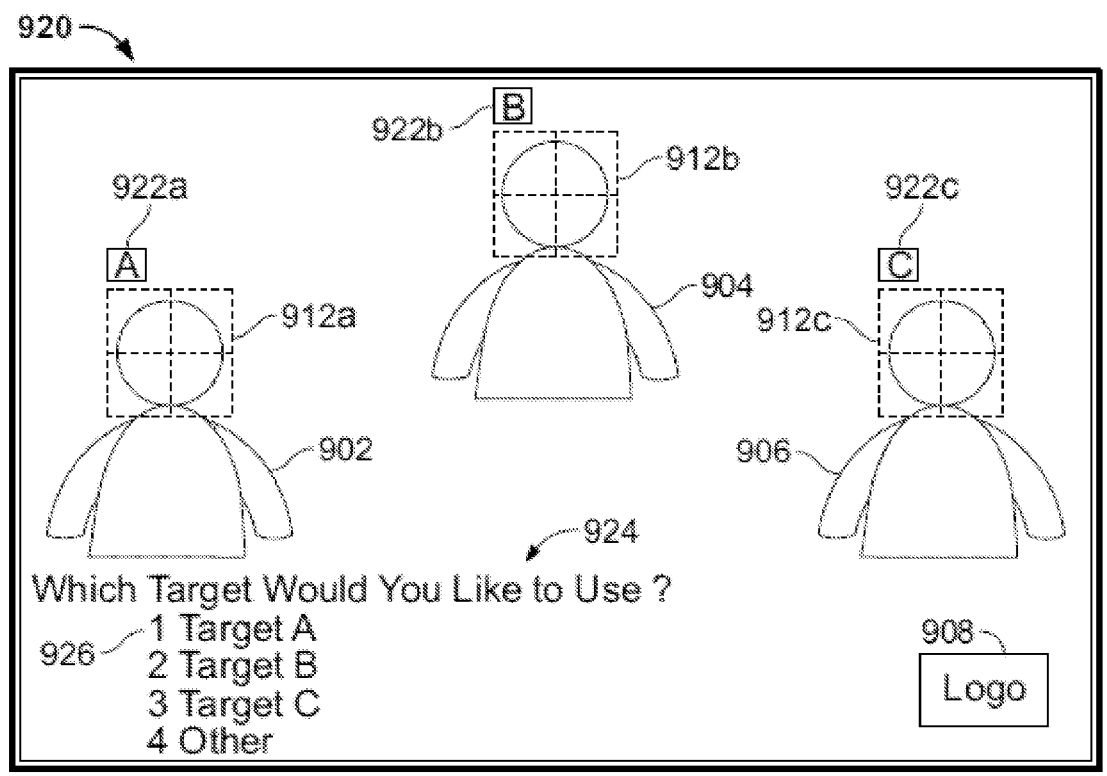
Figure 9D:
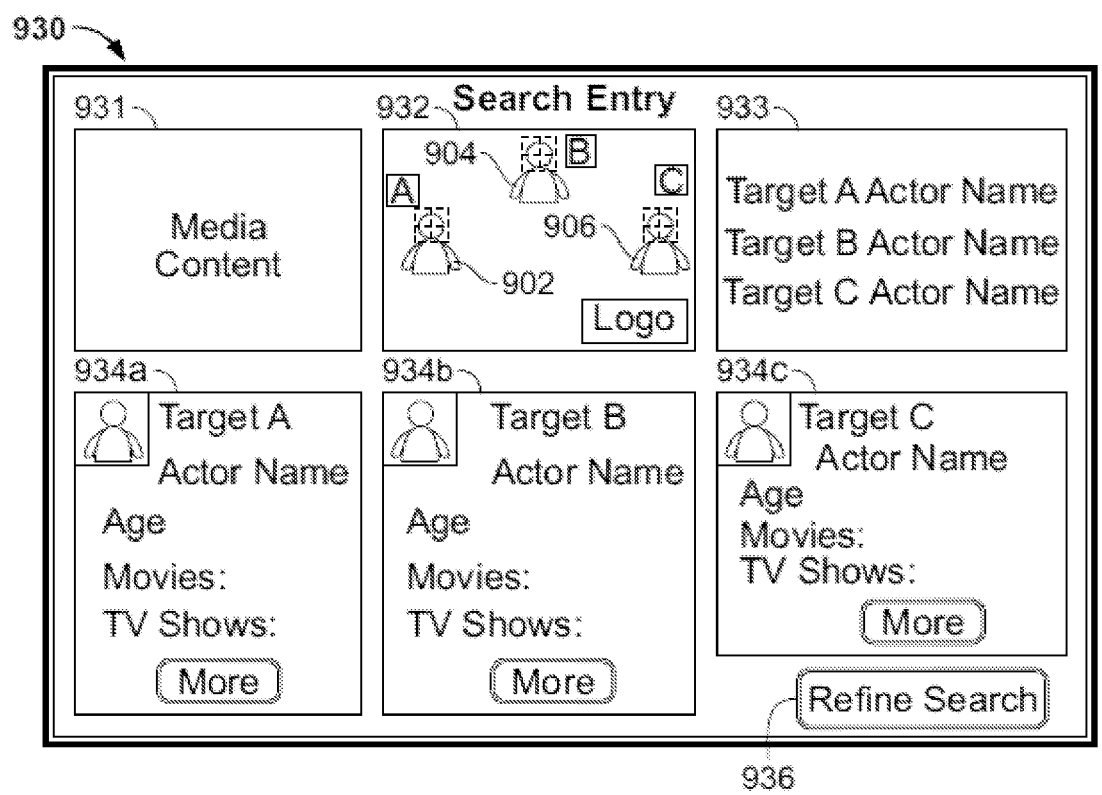

FIG. 9B shows snapshot image 910, which is captured from display 900 (FIG. 9A) and sent to a search system. The system analyzes the image and recognizes features of the image that can be targeted for a search. The search system recognizes the presence of three faces, the faces of actors 902, 904, and 906, on screen and isolates the three faces. Targeted feature indicators 912*a*, 912*b*, and 912*c* may be placed on the faces of actors 902, 904, and 906, respectively. In addition to the faces, there may be other recognizable objects in snapshot image 910. The search system may decide not to use the other recognizable objects as targeted features. For example, if past search history indicates that searches to identify faces are more common than searches to identify background objects, the search system will use the faces as targeted features and will not use recognizable objects in the background of snapshot image 910 as targeted features. If the user does wish to target the background objects, the user may refine the search, as is described below with respect to FIGS. 9C and 9D.

The system also analyzes user input received with snapshot image 910. The user input may indicate which feature or features of snapshot image 910 the user would like to use for the search. For example, the user input may include an indication that the user would like to identify actor 902 rather than identifying actors 904 or 906. The user input may include a description of the visual characteristics of the face of actor 902 that indicates to the system that targeted feature indicator 912a should be used for the search or, alternatively, may include a spatial description for actor 902, such as "left" or "foreground", if actor 902 is in the left foreground of snapshot image 910. User input provided with snapshot image 910 may not have an indication of the feature the user would like to use or may have an ambiguous indication, such as "face", that does not differentiate the possible target features in the image, and thus may not be useful to narrow the search.

The system also analyzes supplemental data received with snapshot image 910 that may provide information about the media content from which snapshot image 910 is captured. The supplemental data may indicate that snapshot image 910 was captured from a movie shown on broadcast television. Using this information, the search system may recognize channel logo 908 in snapshot image 910 and decide not to use the logo as a targeted feature since the movie is not likely to be strictly associated with the channel on which it is shown. If the logo is useful or the user would like to use the logo in the search, the search may be refined to include the logo.

The search system creates a search query based on snapshot image 910. The system recognizes that multiple similar features, the faces of actors 902, 904, and 906, are potential target features for the image. Before creating a search query, the system may prompt the user to identify the feature or features he or she would like to use for the search in prompt screen 920 of FIG. 9C. Prompt screen 920 initiates interaction with the user to clarify the user's intentions for the search. Prompt screen 920 presents the user with a processed form of the snapshot image, including potential target feature indicators 912a, 912b, and 912c, and allows the user to clarify which potential targets are intended for the search. Options indicators 922a, 922b, and 922c are placed with target feature indicators 912a, 912b, and 912c, respectively, and question 924 is presented to the user. Question 924 prompts the user to select one of the features associated with options indicators 922a, 922b, and 922c to be used for the search. Question 924 also provides the user with an option to indicate that a feature that is not targeted in prompt screen 920, such as logo 908, should be used for the search. The user's selection may be made using any suitable device, including the media device on which media content is presented in display 900 (FIG. 9A), and using any suitable user input interface, including the user input interfaces discussed above with respect to user input interface 210 of FIG. 2. If the user indicates that a new feature not targeted in prompt screen 920 should be used, he or she may interact with prompt screen 920 to indicate the new feature by moving one of the existing target indicators or by creating a new target indicator. If the user selects option 926 in question 924, the search system uses targeted feature indicator 912a to identify actor 902. The system then presents the user with a search results display for the identified actor, which may be substantially similar to results display 620 discussed above with respect to FIG. 6C.

In an alternative embodiment, the search system may run a search for each of the faces targeted by target feature indicators 912a, 912b, and 912c before prompting the user to select a target. The system identifies each of the actors 902, 904, and 906 and presents information for each actor in results display 930 of FIG. 9D. Media content window 931 and search entry 932 of results display 930 may have substantially the same features as media content window 621 and search entry 622 of results display 620 in FIG. 6C. Summary 933 of results display 930 includes the names of actors 902, 904, and 906 identified from search entry 932. Summary 933 may be interactive and allow the user to select one of the names of actors 902, 904, and 906. If the user selects one of the names, the system creates a new results display for the selected actor that may have substantially the same features as results display 620 discussed above with respect to FIG. 6C. Results display 930 also includes quick profiles 934a, 934b, and 934c for actors 902, 904, and 906, respectively. The quick profiles contain a brief listing of information for each of the identified actors. The quick profiles may include an option for the user to select one of the actors. If the user selects one of the actors, the system creates a new results display for the selected actor that may have substantially the same features as results display 620 discussed above with respect to FIG. 6C. Results display 930 also includes option 936 that allows the user to refine the search if, for example, the user wishes to target a feature that is not targeted in search entry 932.

Figure 10:
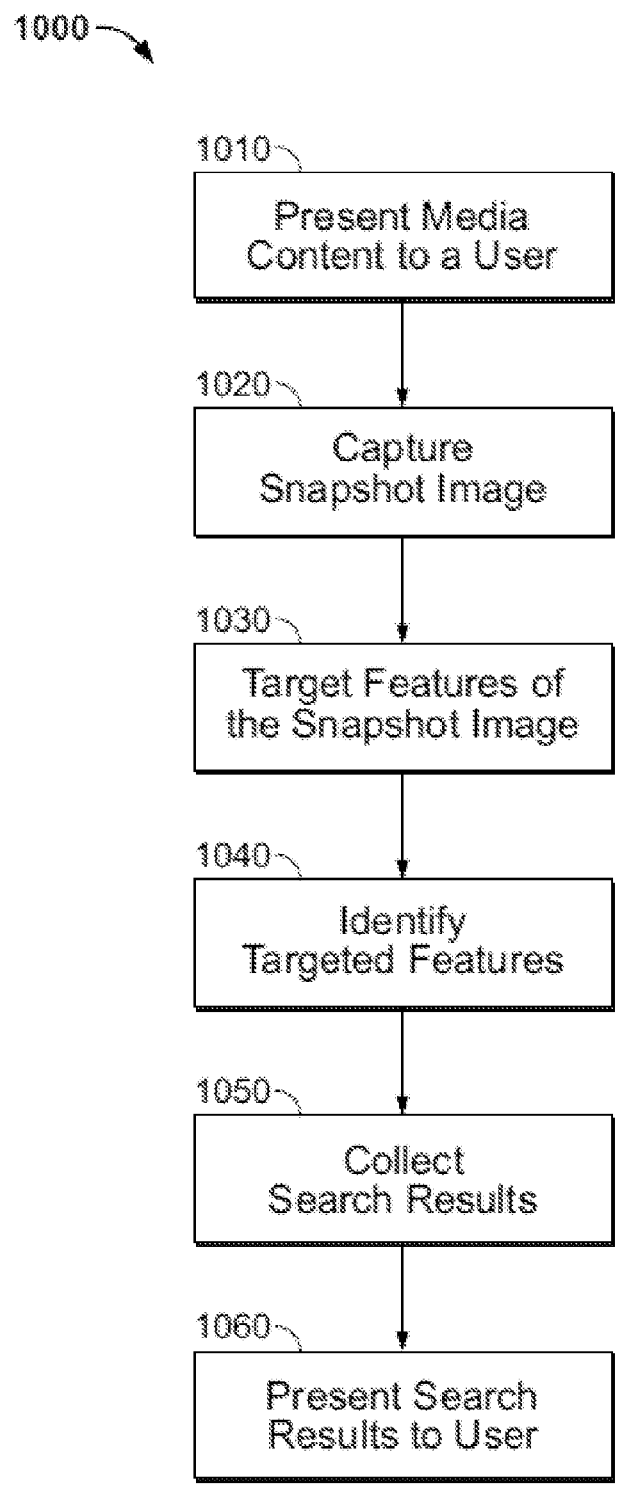
FIG. 10 is a flow chart of illustrative steps involved in performing an image-based search related to media content using a snapshot image in accordance with an embodiment of the present invention.
Figure 11:
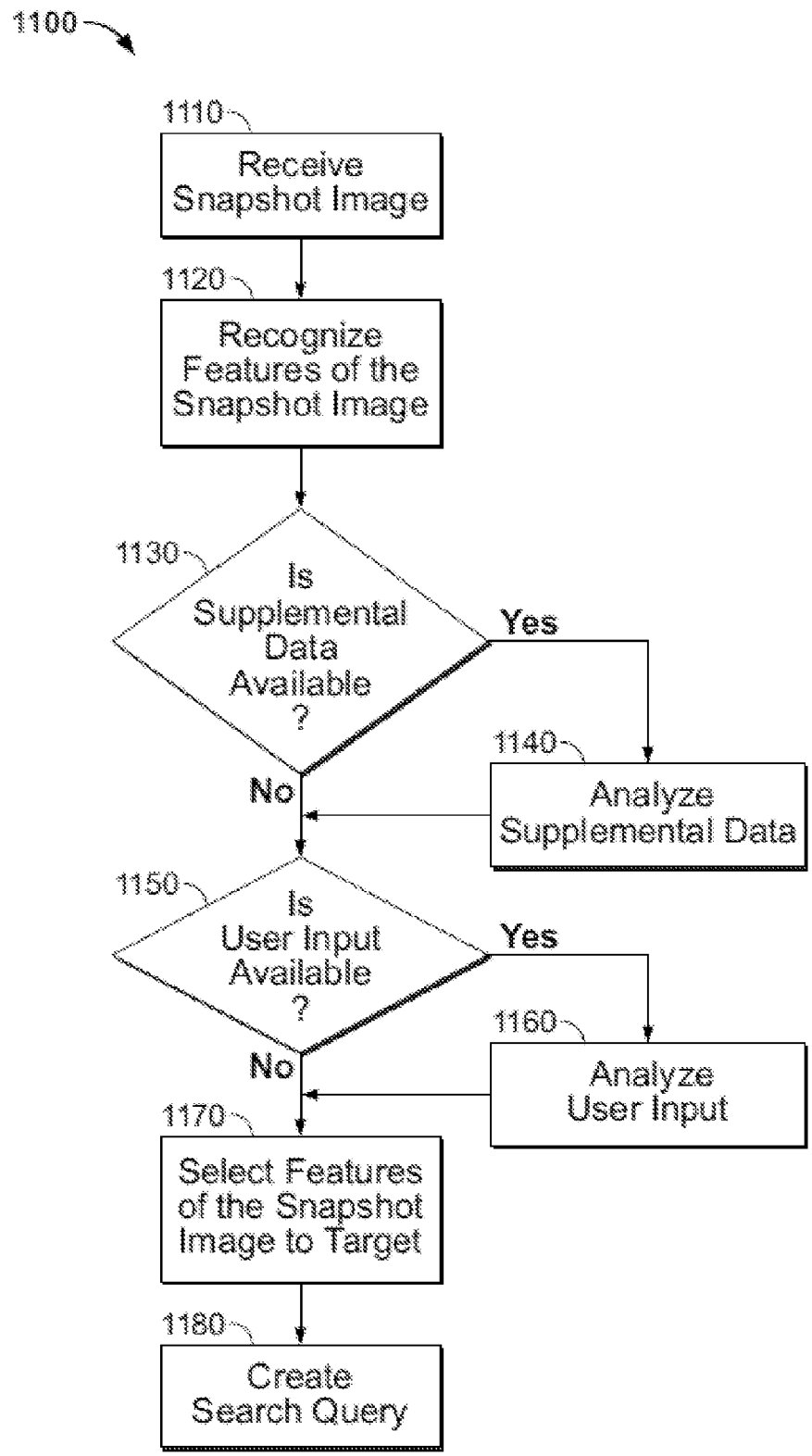
FIG. 11 is a flow chart of illustrative steps involved in recognizing and targeting features in a snapshot image to create a search query in accordance with an embodiment of the present invention.
Figure 12:
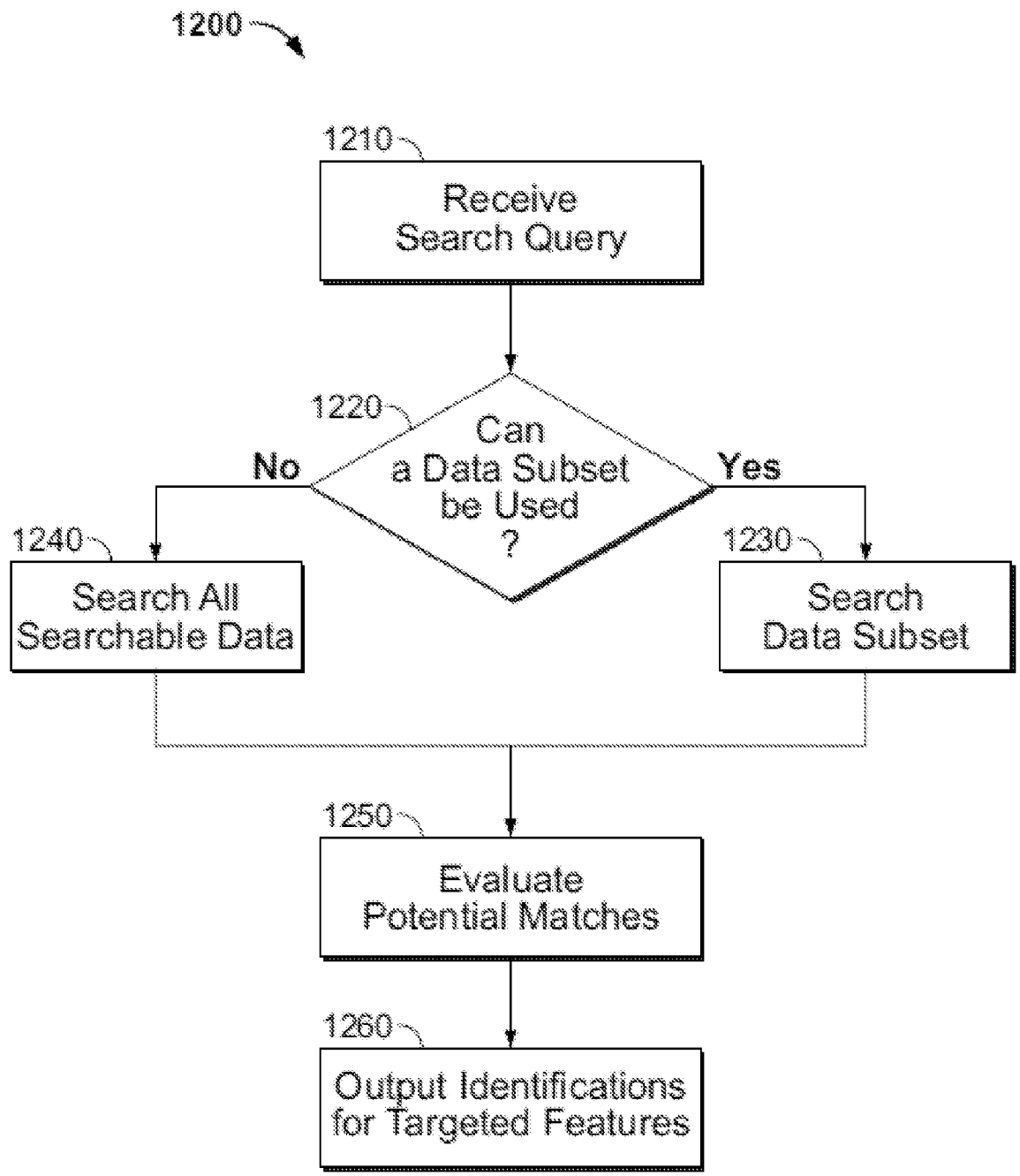
FIG. 12 is a flow chart of illustrative steps involved in identifying the targeted features of a snapshot image in accordance with an embodiment of the present invention.

FIGS. 10-12 show illustrative flow diagrams for processes related to the present invention. Steps in the processes may be added, omitted, or performed in any order without departing from the scope of the invention.

FIG. 10 shows an illustrative flow diagram 1000 for performing an image-based search related to media content using a snapshot image (e.g. snapshot image 610 of FIG. 6B) in accordance with the present invention.

Media content is presented to a user at step 1010. Media content may be viewed by the user on any suitable device, including any of the media devices discussed above with respect to FIGS. 2 and 3. A controller (e.g., controller 104 of FIG. 1) may be used to configure and control the performance of the media device. The user may wish to perform a search based on the media content presented at step 1010. The search may be performed to identify an object on screen, identify an actor, obtain information about the media content, find the source of the media content, locate related media content, or for any other suitable purpose.

At step 1020, the user initiates the desired search by capturing a snapshot image of the media content being viewed. The user captures the snapshot image when the desired searching feature of the media content is on screen. For example, if the user wishes to perform a search related to an item in a commercial, the user captures the snapshot image when the item is shown in the commercial. In some embodiments, the user captures the snapshot image using the media device. The media device may receive a command from the user via a control button on the media device or a voice command spoken by the user to capture the snapshot image. In some embodiments, the user captures the snapshot image using a controller for the media device. The controller may include a button dedicated to capturing snapshot images or may allow the user to pause the media content at any time to capture the snapshot image. Whether the snapshot image is captured using the media device, a controller, or any other device, the snapshot image is sent to a search system.

Supplemental data may be sent to the search system with the snapshot image. Supplemental data contains information (e.g., information from media content data source 318 of FIG. 3) related to the media content from which the snapshot image is captured. The information may contain any suitable information related to the media content, including information discussed above with respect to FIG. 7. Supplemental data provides context information for the snapshot image that can be used to narrow the search performed by the search system. Snapshot images captured from one type of media content may contain people, places, objects, or other features that are similar to snapshot images captured from other different types of media content. The supplemental data provided with the snapshot images may provide different context to the different snapshot images and allow the system to perform effective targeted searches using the context provided by the supplemental data.

User input may be sent to the search system with the snapshot image. User input may be received from the user by the media device, a controller for the media device, or by any other suitable device. Information included in user input may provide context to the media content in addition to the context provided by information in supplemental data. In some embodiments, information sent by the user may provide useful context to media content that is not provided by supplemental data. Supplemental data may not be available for media content if, for example, the media content is recorded video from an external source, such as a personal video camera. Information sent by the user may provide useful context, such as the subject matter of the recorded video or the situation in which the video is recorded. Information included in user input may also indicate a user's intentions or preferences for the image-based search. User input may indicate the features of the media content and the snapshot image that the user wishes to target for the search. If multiple features of the snapshot image can be used as the subject of a search, user input may indicate which of the features should be used. User input may also specify the types of results desired (e.g., Internet content or broadcast television) and the approach by which the results are presented (e.g., on the media device or via email).

The snapshot image, supplemental data, and user input are received by the search system, and the search system targets features of the snapshot image to be used for the search at step 1030. The search system analyzes the snapshot image to find any recognizable features. The search system then selects recognizable features to be used as targeted features for the search. The system creates a search query that may include images and/or text descriptors and sends the search query to a search engine. The process of recognizing and targeting features in the snapshot image to create a search query is discussed in more detail below with respect to FIG. 11.

A search engine (e.g., search engine 500 of FIG. 5) receives the search query created in step 1030, and the targeted features of the snapshot image are identified at step 1040. The search system identifies the targeted features by matching images and text descriptors included in the search query with images and text descriptors from a collection of searchable data accessed by the search engine. Potential matches for the targeted features are found in the searchable data, and the search engine evaluates the potential matches to determine accepted matches. The accepted matches are used as identifications for each of the targeted features. The process of identifying the targeted features of a snapshot image is discussed in more detail below with respect to FIG. 12.

The search engine uses the identifications for the targeted features to collect search results at step 1050. The search results collected may be media content, media content information, Internet content, or any other suitable content related to the identified features of the snapshot image. In some embodiments, the identified features may dictate the types of search results that are collected. For example, if actors are identified in the snapshot image, media content starring the actors may be collected. If a retail item is identified in the snapshot image, Internet shopping results for the retail item may be collected. The collected search results, which be of the same or different types, are then assembled for presentation to the user. Assembling the search results may include placing the result items in templates retrieved from memory, for example, by the search engine.

The collected search results are presented to the user at step 1060. In some embodiments, the search results are presented to the user on the display of the media device from which the snapshot image was captured. The search results may be presented in a search results display (e.g., results display 620 of FIG. 6C) that allows the user to continue viewing media content while viewing and navigating through the search results. In some embodiments, the search results are presented to the user on a display of a controller for the media device. Presenting the results on a controller allows the media device to continue normal presentation of media content while the user views and navigates through the search results on the controller. In some embodiments, the search is initiated on one device (e.g., the media device), and the results are presented on a different device (e.g., a controller for the media device). In some embodiments, the search results are displayed on an external device (e.g., a mobile telephone) that is not part of the media distribution system. Search results may be displayed directly to the user, sent to the user via email, presented through a web browser, or presented by any other suitable approach.

FIG. 11 shows an illustrative flow diagram 1100 for recognizing and targeting features in a snapshot image (e.g., snapshot image 610 of FIG. 6B) to create a search query in accordance with the present invention. For the purpose of illustration and not limitation, the process shown in FIG. 11 is described herein as recognition and targeting performed by an image processor, but the process may be performed by any suitable device.

A processor (e.g., processor 400 of FIG. 4) receives a snapshot image at step 1110. The snapshot image is captured from media content and may correspond to the snapshot image captured at step 1020 of FIG. 10. The processor may receive supplemental data and user input with the snapshot image that contains information about the media content or the user's preferences for the search to be performed.

The snapshot image is analyzed by the processor at step 1120 to recognize features of the snapshot image. Recognizable features may include people, buildings, objects, logos, text, or any other suitable features of the snapshot image to use in a search. The processor isolates each recognizable feature and analyzes the features to create text descriptors. Creating the text descriptors may include identifying a feature, such as a car or house, or describing visual aspects of a feature, such as a face.

The processor determines if supplemental data is available for the snapshot image at step 1130. If supplemental data is available, the processor analyzes the supplemental data at step 1140. The processor may extract information in the supplemental data from a clean profile of information for the media content (e.g., profile 700 of FIG. 7), or may extract the information by mining supplemental data (e.g., metadata) that contains a combination of readable and nonsensical data. The processor may add the extracted information to the text descriptors created at step 1120. Extracted information that is relevant to the whole snapshot image, such as the name of a movie from which the snapshot image is captured, is included in a text descriptor associated with the whole snapshot image. Extracted information that is relevant to an individual feature of the snapshot image, such as the name of a designer for an item of clothing in the snapshot image, is included in a text descriptor associated with the individual feature.

The processor determines if user input is available for the snapshot image at step 1150. If user input is available, the processor analyzes the user input at step 1160. In some embodiments, the processor may receive user input that dictates the type of search to be performed. The user input may identify which features of the snapshot image should be used in the search or how the search results should be presented in the user. The processor adds information in the user input that dictates aspects of the search preformed to text descriptors for the whole snapshot image. In some embodiments, the processor receives user input that gives context to or describes an individual recognizable feature of the snapshot image, and the processor adds the information to a text descriptor for the individual feature.

The processor analyzes the set of recognizable features and text descriptors and determines which features of the snapshot image to target for the search at step 1170. In some embodiments, the processor determines the targeted features based on the types of the recognizable features. For example, for snapshot images that contain a mix of logos and the faces of characters, a user is more likely to want to identify the faces than the logos. Thus, the processor may analyze the recognizable features and only target the faces in the snapshot image. In some embodiments, the processor determines the targeted features based on user preferences. For example, a search history log maintained by the search system may indicate that a user performs searches to identify faces on screen more often than any other type of search. If the processor receives a set of recognizable features containing faces and other features from the user, the processor targets only the faces. In some embodiments, the processor allows the user to manually select the targeted features. For example, the processor may present the snapshot image to the user and allow the user to select features of the snapshot image to target. The processor may indicate all recognizable features and allow the user to select features to target from among the recognizable features, or the processor may present an unmodified copy of the snapshot image and allow the user to create targets for any features.

The processor creates a search query to send to a search engine at step 1180. The search query includes images and/or text descriptors associated with the images. In some embodiments, the processor includes the full snapshot image in the search query and places indicators on the targeted features to provide guidance to the search engine. In some embodiments, the processor isolates each targeted feature from the snapshot image and creates a single cropped search image for each targeted feature in the snapshot image. Each cropped search image is linked to a text descriptor that is specific to the targeted feature contained in the cropped search image. In some embodiments, the processor includes an unmodified form of the full snapshot image with text descriptors indicating the targeted features. In some embodiments, the processor links targeted features that may be used together. For example, a snapshot image taken from a television commercial may include a retail item and text advertising the item. The processor links the retail item and the text since the text may identify the manufacturer or a retailer for the retail item. The created search query is sent to a search engine to identify and gather results for the targeted features.

FIG. 12 shows an illustrative flow diagram 1200 for identifying the targeted features of a snapshot image (e.g., snapshot image 620 of FIG. 6C).

A search engine (e.g., search engine 500 of FIG. 5) receives a search query (e.g., the search query created at step 1180 of FIG. 11) for a snapshot image at step 1210. The search query includes a combination of search images and text descriptors for targeted features of the snapshot image.

At step 1220, the search engine analyzes the images and text in the search query to determine if a data subset can be used for the search. In some embodiments, the search engine may have access to a large amount of searchable data, and identifying a subset of the searchable data may result in a more effective search. The subset may correspond specifically to the media content from which the snapshot image is captured, and the search engine may select the data subset based on information in the text descriptors included in the search query. For example, if the snapshot image is captured from a television show, text descriptors may identify the show, and the data subset may be specific to the television series or the episode of the series being viewed by the user. If a data subset is available, the search engine searches the data subset for potential matches to targeted features in the snapshot image at step 1230. If no data subset is available, the search engine searches all searchable data for potential matches to targeted features in the snapshot image at step 1240. If a subset is searched at step 1230 and no potential matches are found, the search engine may broaden the search and search all searchable data for potential matches at step 1240.

Potential matches are found by comparing images and/or data in the search query to images and/or data contained in the collection of searchable data. Each image in the searchable data may be associated with known information identifying the image or features of the image. An image in the searchable data may be compared to an image in the search query by evaluating the similarity between visual aspects or information associated with both images. To compare visual image aspects, the search engine may deploy a pattern matching algorithm that compares visual patterns of the images. For example, for two images of two faces, the pattern matching algorithm may compare hair color, hair style, eye color, face size, nose shape, or any other suitable features of the two images. Images determined to have a suitable level of pattern matching may be determined as potential matches.

The search engine evaluates potential matches to select accepted matches for the targeted features at step 1250. Accepted matches are used as identifications of the targeted features. The search engine evaluates a potential match by determining the similarity between images and text descriptors for the potential match and images and text descriptors from the search query for the targeted feature. Similarity may be based on matching keywords, comparing aspects of images, or by any other suitable comparison. The search engine uses the similarity between targeted features and potential matches to determine which potential matches are accepted matches. The determination of an accepted match may be made based on a similarity threshold, a ranking of the potential matches, or by any other suitable approach. If a search is performed using a data subset at step 1230 and no potential matches are determined to be an accepted match at step 1250, the search engine may perform a broader search using all searchable data at step 1240.

The search engine sends the identifications for targeted features to a results generator at step 1260. The results generator gathers search results based on the identifications and presents the search results to the user. The search results may include media content, media content information, Internet content, any other suitable content, or any suitable combination thereof. The results may be presented on any suitable device, including the media device from which the snapshot image is captured or a controller for the media device, and by any suitable approach, including the approaches discussed above with respect to FIG. 1.

The foregoing is merely illustrative of the principles of the present invention, and various modifications can be made by those skilled in the art without departing from the scope and spirit of the invention.

What is claimed is:

1. A method for performing an image-based search, the method comprising:
   receiving a snapshot image captured from video of media content being displayed by user equipment;
   receiving supplemental data associated with the media content;
   retrieving a plurality of images from a collection of searchable data by comparing the supplemental data to data associated with each image of the plurality of images;
   processing visual attributes of each image of the plurality of retrieved images to determine whether at least one image of the plurality of retrieved images includes at least one recognizable feature of the snapshot image;
   providing at least one first search result based on determining at least one image of the plurality of retrieved images has the at least one recognizable feature;
   receiving a user request to refine the image-based search;
   processing at least one new image based at least in part on the user request; and
   providing at least one second search result based on the at least one new image.

2. The method of claim 1, wherein the snapshot image contains more than one recognizable feature, and further comprising targeting at least one recognizable feature of the snapshot image based on user input.

3. The method of claim 2, wherein the user input is received in response to a prompt presented to the user to select the recognizable features to be targeted.

4. The method of claim 1, wherein:
   the snapshot image contains more than one recognizable feature; and
   the providing comprises providing a profile of information for each image of the plurality of retrieved images having the at least one recognizable feature.

5. The method of claim 4, further comprising:
   receiving a user selection of an image of the plurality of retrieved images having the at least one recognizable feature; and
   providing search results related to the selected image.

6. The method of claim 1, wherein the processing comprises comparing visual patterns of the snapshot image to visual patterns of each image of the plurality of images.

7. The method of claim 1, wherein:
   the media content is a broadcast television program; and
   the supplemental data is guidance data used in an electronic program guide.

8. The method of claim 1, further comprising:
   determining a user's location; and
   providing search results related to the user's location.

9. A search system for performing an image-based search, the system comprising:
   processing circuitry configured to:
      receive a snapshot image captured from video of media content being displayed by user equipment; and
      receive supplemental data associated with the media content; and
   searching circuitry responsive to the processing circuitry and configured to:
      retrieve a plurality of images from a collection of searchable data by comparing the supplemental data to data associated with each image of the plurality of images;
      process visual attributes of each image of the plurality of retrieved images to determine whether at least one image of the plurality of images includes at least one recognizable feature of the snapshot image;
      provide at least one first search result based on determining at least one image of the plurality of retrieved images has the at least one recognizable feature;
      receive a user request to refine the image-based search;
      process at least one new image based at least in part on the user request; and
      provide at least one second search result based on the at least one new image.

10. The system of claim 9, wherein the snapshot image contains more than one recognizable feature, and the processing circuitry is further configured to target at least one recognizable feature of the snapshot image based on user input.

11. The system of claim 10, wherein the user input is received by the processing circuitry in response to a prompt presented to the user to select the recognizable features to be targeted.

12. The system of claim 9, wherein:
   the snapshot image contains more than one recognizable feature; and
   the searching circuitry is configured to provide a profile of information for each image of the plurality of retrieved images having the at least one recognizable feature.

13. The system of claim 12, wherein:
   the processing circuitry is further configured to receive a user selection of an image of the plurality of retrieved images having the at least one recognizable feature; and
   the searching circuitry is further configured to provide search results related to the selected image.

14. The system of claim 9, wherein the searching circuitry is configured to compare visual patterns of the snapshot image to visual patterns of each image of the plurality of images.

15. The system of claim 9, wherein:
   the media content is a broadcast television program; and
   the supplemental data is guidance data used in an electronic program guide.

16. The system of claim 9 wherein:
   the processing circuitry is further configured to determine a user's location; and
   the searching circuitry is further configured to provide search results related to the user's location.

* * * * *